US011750032B2

(12) United States Patent
Hedeen et al.

(10) Patent No.: US 11,750,032 B2
(45) Date of Patent: *Sep. 5, 2023

(54) GUN-MOUNTED RECORDING DEVICE

(71) Applicant: Laser Aiming Systems Corporation, Maple Plain, MN (US)

(72) Inventors: Brian Hedeen, Orono, MN (US); Mike Cisewski, Hutchinson, MN (US); Ethan Mork, Young America, MN (US)

(73) Assignee: Laser Aiming Systems Corporation, Maple Plain, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,240

(22) Filed: Jul. 22, 2021

(65) Prior Publication Data
US 2022/0021815 A1 Jan. 20, 2022

Related U.S. Application Data

(63) Continuation of application No. 16/368,517, filed on Mar. 28, 2019, now abandoned, which is a
(Continued)

(51) Int. Cl.
H02J 50/10 (2016.01)
H02J 7/34 (2006.01)
(Continued)

(52) U.S. Cl.
CPC ............. *H02J 50/10* (2016.02); *F41C 27/00* (2013.01); *F41J 5/10* (2013.01); *H02J 7/0045* (2013.01);
(Continued)

(58) Field of Classification Search
None
See application file for complete search history.

(56) References Cited

U.S. PATENT DOCUMENTS 2,138,978 A 12/1938 Meine
2,546,242 A 3/1951 Stinson
(Continued)

OTHER PUBLICATIONS

International Preliminary Report on Patentability issued in PCT/US2017/056780, dated Apr. 25, 2019, 9 pages.
(Continued)

*Primary Examiner* — Rebecca A Volentine
(74) *Attorney, Agent, or Firm* — Christensen, Fonder, Dardi & Herbert PLLC; William E. Anderson

(57) ABSTRACT

In an exemplary embodiment, a gun-mounted recording device comprises a housing configured to be mounted to a gun, a recording module arranged within the housing, the recording module comprising a first electrical contact, and a power supply configured to be detachably coupled to the housing. The power source comprises a second electrical contact. The first electrical contact and the second electrical contact are configured to contact each other and form a circuit when the power source is coupled to the housing in order for the power source to supply power to the recording module. The first electrical contact, the second electrical contact, or both are configured to move in response to relative movement between the power source and the housing when the power source is coupled to the housing, in order to maintain the supply of power from the power source to the recording module.

20 Claims, 22 Drawing Sheets

Related U.S. Application Data continuation-in-part of application No. 15/784,502, filed on Oct. 16, 2017, now Pat. No. 11,306,987.

(60) Provisional application No. 62/408,616, filed on Oct. 14, 2016.

(51) Int. Cl.
| | |
|---|---|
| *F41J 5/10* | (2006.01) |
| *F41C 27/00* | (2006.01) |
| *H02J 7/00* | (2006.01) |
| *H04N 23/51* | (2023.01) |
| *H04N 23/57* | (2023.01) |
| *H04N 23/65* | (2023.01) |

(52) U.S. Cl.
CPC ............ *H02J 7/345* (2013.01); *H04N 23/51* (2023.01); *H04N 23/57* (2023.01); *H04N 23/651* (2023.01)

(56) References Cited

U.S. PATENT DOCUMENTS

| | | |
|---|---|---|
| 3,239,658 A | 3/1966 | Castaldo |
| 3,405,448 A | 10/1968 | Weatherby |
| 4,310,980 A | 1/1982 | Pilkington |
| 4,494,328 A | 1/1985 | Stevens |
| 4,539,769 A | 9/1985 | Stevens et al. |
| 4,571,870 A | 2/1986 | Heideman et al. |
| 4,580,362 A | 4/1986 | Stevens |
| 4,713,889 A | 12/1987 | Santiago |
| 4,738,044 A | 4/1988 | Osterhout |
| 4,777,754 A | 10/1988 | Reynolds, Jr. |
| 5,025,564 A | 6/1991 | Sanders |
| 5,033,219 A | 7/1991 | Johnson et al. |
| 5,107,612 A | 4/1992 | Bechtel |
| 5,215,238 A | 6/1993 | Baruch |
| 5,282,592 A | 2/1994 | Ma |
| 5,282,594 A | 2/1994 | Huang |
| D347,018 S | 5/1994 | Jehn |
| D349,510 S | 8/1994 | Tomita |
| 5,355,608 A | 10/1994 | Teetzel |
| 5,430,967 A | 7/1995 | Woodman, III et al. |
| 5,481,819 A | 1/1996 | Teetzel |
| 5,581,898 A | 12/1996 | Thummel |
| 5,591,032 A | 1/1997 | Powell et al. |
| 5,685,105 A | 11/1997 | Teetzel |
| 5,706,600 A | 1/1998 | Toole et al. |
| 5,784,823 A | 7/1998 | Chen |
| 5,787,628 A | 8/1998 | Teetzel |
| 5,822,905 A | 10/1998 | Teetzel |
| 5,867,930 A | 2/1999 | Kaminski et al. |
| 6,112,962 A | 9/2000 | Matthews |
| 6,185,854 B1 | 2/2001 | Solinsky et al. |
| 6,295,793 B1 | 10/2001 | Takayanagi |
| 6,378,237 B1 | 4/2002 | Matthews et al. |
| 6,393,752 B1 | 5/2002 | Oliver et al. |
| 6,421,947 B1 | 7/2002 | Fuller |
| 6,571,503 B2 | 6/2003 | Thorpe |
| 6,574,901 B1 | 6/2003 | Solinsky et al. |
| 6,578,311 B2 | 6/2003 | Danielson et al. |
| 6,637,144 B2 | 10/2003 | Nelson et al. |
| 6,705,038 B2 | 3/2004 | Davenport et al. |
| 6,735,897 B1 | 5/2004 | Schmitter et al. |
| 7,117,624 B2 | 10/2006 | Kim |
| 7,225,577 B1 | 6/2007 | Wang |
| 7,226,183 B2 | 6/2007 | Galli et al. |
| D548,385 S | 8/2007 | Sharrah et al. |
| 7,260,912 B2 | 8/2007 | Liu |
| 7,305,790 B2 | 12/2007 | Kay |
| 7,334,365 B2 | 2/2008 | Kim |
| D568,508 S | 5/2008 | Howe et al. |
| D578,599 S | 10/2008 | Cheng |
| 7,523,583 B2 | 4/2009 | Cheng |
| 7,591,098 B2 | 9/2009 | Matthews et al. |
| D603,478 S | 11/2009 | Hughes |
| 7,644,839 B2 | 1/2010 | McNulty, Jr. |
| D612,756 S | 3/2010 | D'Amelio et al. |
| D612,970 S | 3/2010 | Sharrah et al. |
| 7,743,547 B2 | 6/2010 | Houde-Walter |
| D628,323 S | 11/2010 | Matthews et al. |
| D628,324 S | 11/2010 | Matthews et al. |
| 7,866,515 B1 | 1/2011 | Buis, III et al. |
| D636,049 S | 4/2011 | Hughes et al. |
| D636,837 S | 4/2011 | Hughes et al. |
| 8,028,461 B2 | 10/2011 | NuDyke |
| 8,109,032 B2 | 2/2012 | Faifer |
| 8,132,355 B1 | 3/2012 | Kincaid et al. |
| 8,182,109 B2 | 5/2012 | Matthews et al. |
| 8,220,946 B1 * | 7/2012 | Teetzel .................. F41G 11/003 89/200 |
| 8,256,154 B2 | 9/2012 | Danielson et al. |
| D669,553 S | 10/2012 | Hughes et al. |
| D669,958 S | 10/2012 | Essig et al. |
| D669,959 S | 10/2012 | Johnston et al. |
| D672,005 S | 12/2012 | Hedeen et al. |
| 8,336,247 B2 | 12/2012 | Haering |
| D674,525 S | 1/2013 | Sharrah et al. |
| 8,371,729 B2 | 2/2013 | Sharrah et al. |
| 8,690,032 B2 | 4/2014 | Baumann et al. |
| D709,158 S | 7/2014 | Wells |
| D709,585 S | 7/2014 | Klecker et al. |
| D712,001 S | 8/2014 | Wells |
| 8,995,141 B1 | 3/2015 | Rathi et al. |
| D732,134 S | 6/2015 | Wells |
| D781,983 S | 3/2017 | Wells |
| 9,658,031 B1 | 5/2017 | Hedeen et al. |
| 9,728,865 B1 | 8/2017 | Voli |
| 9,897,407 B2 | 2/2018 | Kramer |
| 9,958,228 B2 | 5/2018 | Stewart et al. |
| 10,495,398 B2 | 12/2019 | Kramer |
| 2002/0067425 A1 | 6/2002 | Iverson |
| 2003/0029072 A1 | 2/2003 | Danielson et al. |
| 2003/0101632 A1 | 6/2003 | Davenport et al. |
| 2004/0068913 A1 | 4/2004 | Solinsky et al. |
| 2005/0066567 A1 | 3/2005 | Newkirk et al. |
| 2005/0115142 A1 | 6/2005 | Kim |
| 2005/0257415 A1 | 11/2005 | Solinsky et al. |
| 2005/0279790 A1 | 12/2005 | Lowe |
| 2006/0026886 A1 | 2/2006 | Doukas |
| 2006/0082730 A1 | 4/2006 | Franks |
| 2006/0116183 A1 | 6/2006 | Infanti |
| 2006/0216980 A1 | 9/2006 | Lewis |
| 2007/0068058 A1 | 3/2007 | Remo |
| 2007/0079538 A1 | 4/2007 | Smith et al. |
| 2007/0086749 A1 | 4/2007 | Isobe et al. |
| 2007/0193103 A1 | 8/2007 | Cheng |
| 2007/0257987 A1 | 11/2007 | Wang |
| 2008/0060248 A1 | 3/2008 | Pine et al. |
| 2008/0094473 A1 | 4/2008 | Rom |
| 2008/0099224 A1 | 5/2008 | Hofmann et al. |
| 2008/0112698 A1 | 5/2008 | Ray |
| 2008/0163749 A1 | 7/2008 | Reimer |
| 2008/0202010 A1 | 8/2008 | Matthews et al. |
| 2008/0272162 A1 | 11/2008 | Gamble |
| 2009/0314813 A1 | 12/2009 | Woolery |
| 2010/0275497 A1 | 11/2010 | Brentzel |
| 2010/0277591 A1 | 11/2010 | Kowalsky |
| 2011/0252681 A1 | 10/2011 | Houde-Walter et al. |
| 2011/0283585 A1 | 11/2011 | Cabahug et al. |
| 2012/0144715 A1 | 6/2012 | Simpson |
| 2014/0150323 A1 | 6/2014 | Kowalczyk, Jr. et al. |
| 2014/0210646 A1 | 7/2014 | Subramanya |
| 2014/0215885 A1 | 8/2014 | Sullivan et al. |
| 2014/0317988 A1 * | 10/2014 | Battis ....................... F41G 1/36 42/114 |
| 2015/0184978 A1 | 7/2015 | Hedeen |
| 2015/0198406 A1 | 7/2015 | Ling |
| 2015/0226521 A1 | 8/2015 | Patterson et al. |
| 2015/0369554 A1 | 12/2015 | Kramer |
| 2016/0165192 A1 | 6/2016 | Saatchi et al. |
| 2016/0172876 A1 | 6/2016 | Stewart et al. |
| 2016/0195366 A1 | 7/2016 | Kowalczyk et al. |
| 2016/0209167 A1 | 7/2016 | Wells |

(56) References Cited

U.S. PATENT DOCUMENTS

| | | |
|---|---|---|
| 2016/0286156 A1 | 9/2016 | Kovac |
| 2017/0059265 A1 | 3/2017 | Winter et al. |
| 2017/0150448 A1 | 5/2017 | Stagg et al. |
| 2017/0155269 A1 | 6/2017 | Swift |
| 2017/0241742 A1 | 8/2017 | Davidson et al. |
| 2017/0248388 A1* | 8/2017 | Young .................. F41A 17/063 |
| 2017/0316531 A1 | 11/2017 | Smith et al. |
| 2018/0041736 A1 | 2/2018 | Gagnon et al. |
| 2018/0094900 A1 | 4/2018 | Sharrah et al. |
| 2018/0106568 A1 | 4/2018 | Hedeen et al. |
| 2018/0238649 A1 | 8/2018 | Winiecki |
| 2019/0222771 A1 | 7/2019 | Hedeen et al. |
| 2020/0158473 A1 | 5/2020 | Wells et al. |

OTHER PUBLICATIONS

Pogo pin (Mar. 15, 2021) In Wikipedia. https://en.wikipedia.org/wiki/Pogo_pin (Year: 2021).

Gun Magnets & Blog Quick Draw Gun Magnets, online, retrieved on Nov. 7, 2013, at http://quickdrawgunmagnets.com 7 pgs.

"Hall Effect Sensor" Electronics Tutorials [online]. Retrieved Nov. 3, 2017 from the internet http://www.electronics-tutorials.ws/electromagnestism/hall-effect.html 12 pgs.

International Search Report and Written Opinion for Application No. PCT/US17/56780, dated Jan. 2, 2018. 17 pages.

Windham Weaponry, Magnetic Gun Cleaning Mat, Windham Weaponry, Inc. retrieved from the internet on Nov. 7, 2013, http://www.windhamweaponry.com/shopexd.asp?id=260#axzz3dtqyttOU 8 pages.

\* cited by examiner

GUN-MOUNTED RECORDING DEVICE

CROSS REFERENCE TO RELATED APPLICATION

This application is a continuation of U.S. Non-Provisional application Ser. No. 16/368,517, filed Mar. 28, 2019, which is a continuation-in-part of U.S. Non-Provisional application Ser. No. 15/784,502, filed Oct. 16, 2017, which claims the benefit of U.S. Provisional Application No. 62/408,616, filed Oct. 14, 2016, all of which are herein incorporated by reference in their entireties for all purposes.

TECHNICAL FIELD

The present disclosure relates to accessories used with guns. More specifically, the present disclosure relates to recording devices coupled to guns that are configured to record events.

BACKGROUND

Law enforcement use body cameras to record events. In some instances, body cameras have provided support that the use of a gun was justified or unjustified. Body cameras are generally located on the torso of a law enforcement officer. Additionally or alternatively, non-law enforcement may use cameras to record events when using a gun. For example, non-law enforcement may record events when hunting, when using a gun during target practice and/or when using a gun during a competition. Oftentimes, body cameras, stationary cameras and/or non-stationary cameras (e.g., a camera attached to a drone) may be used for this purpose.

SUMMARY

The embodiments provided herein relate to recording devices that provide potential improvements over conventional devices for recording events when using a gun. Furthermore, the embodiments provided herein may be used by law enforcement and non-law enforcement when no other recording device is currently being used. Example embodiments include the following.

In an Example 1, a gun-mounted recording device comprises: a housing configured to be mounted to a gun; a recording module arranged within the housing, the recording module comprising a first electrical contact; and a power supply configured to be detachably coupled to the housing, the power source comprising a second electrical contact, wherein the first electrical contact and the second electrical contact are configured to contact each other and form a circuit when the power source is coupled to the housing in order for the power source to supply power to the recording module, and wherein the first electrical contact, the second electrical contact, or both are configured to move in response to relative movement between the power source and the housing when the power source is coupled to the housing, in order to maintain the supply of power from the power source to the recording module.

In an Example 2, the gun-mounted recording device of claim 1, wherein the first electrical contact, the second electrical contact, or both is a spring contact.

In an Example 3, the gun-mounted recording device of claim 2, wherein the spring contact is gold plated.

In an Example 4, the gun-mounted recording device of claim 2, wherein the spring contact includes a spring-loaded pin configured to adjust a degree of protrusion in response to the relative movement between the power source and the housing.

In an Example 5, the gun-mounted recording device of claim 1, the recording module further comprising an internal power unit configured to supply power to the recording module when the power source is detached from the housing.

In an Example 6, the gun-mounted recording device of claim 1, the recording module further comprising an internal power unit configured to maintain a timestamp of the recording module when the power source is detached from the housing.

In an Example 7, the gun-mounted recording device of claim 1, the recording module further comprising an internal power unit configured to supply power to the recording module when the power source is below a critical threshold of power.

In an Example 8, the gun-mounted recording device of claim 1, the recording module further comprising a capacitor, an inductor, or both configured to supply power to the recording module when the power source is detached from the housing, the power source is below a critical threshold of power, or both.

In an Example 9, the gun-mounted recording device of claim 1, the recording module further comprising an internal power unit configured to be inductively charged.

In an Example 10, the gun-mounted recording device of claim 1, wherein the first electrical contact includes a fixed end fixedly coupled to the recording module and a free end configured to move in response to the relative movement between the power source and the housing to maintain the supply of power from the power source to the recording module.

In an Example 11, the gun-mounted recording device of claim 1, wherein the housing, the power supply, or both comprise a spring configured to reduce the movement between the housing and the power supply, wherein the spring does not form part of the circuit.

In an Example 12, the gun-mounted recording device of claim 1, the recording module further comprises a processor configured to store to memory a log file of the recording module.

In an Example 13, the gun-mounted recording device of claim 12, wherein the log file comprises at least one selected from the group of: power states, power levels, connectivity of the power source, and recording of the recording module.

In an Example 14, the gun-mounted recording device of claim 13, wherein the processor is configured to instruct the recording module to initiate recording by the recording module prior to restoring settings of the recording module after an interruption of power to the recording module.

In an Example 15, a gun-mounted recording device comprises: a housing configured to be mounted to a gun; a recording module arranged within the housing, the recording module comprising a first circuit; and a power source configured to be detachably coupled to the housing, the power source comprising a second circuit, wherein the power source is configured to inductively supply power to the recording module via the second circuit to the first circuit when the power source is coupled to the housing.

In an Example 16, the gun-mounted recording device of claim 15, wherein recording module further comprises an internal power unit configured to supply power to the recording module when the power source is detached from the housing.

In an Example 17, the gun-mounted recording device of claim 15, further comprising an internal power unit configured to maintain a timestamp of the recording module.

In an Example 18, the gun-mounted recording device of claim 15, further comprising an internal power unit configured to supply power to the recording module when the power source is below a critical threshold of power.

In an Example 19, the gun-mounted recording device of claim 15, the recording module further comprising a capacitor, an inductor, or both configured to supply power to the recording module when the power source is detached from the housing, the power source is below a critical threshold of power, or both.

In an Example 20, the gun-mounted recording device of claim 15, wherein the recording module includes a first electrical contact and the power source includes a second electrical contact, wherein the first electrical contact and the second electrical contact are configured to contact each other and form a circuit when the power source is coupled to the housing in order for the power source to supply power to the recording module, and wherein the first electrical contact, the second electrical contact, or both are configured to move in response to relative movement between the power source and the housing when the power source is coupled to the housing, in order to maintain the supply of power from the power source to the recording module.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

DETAILED DESCRIPTION

Figure 1:
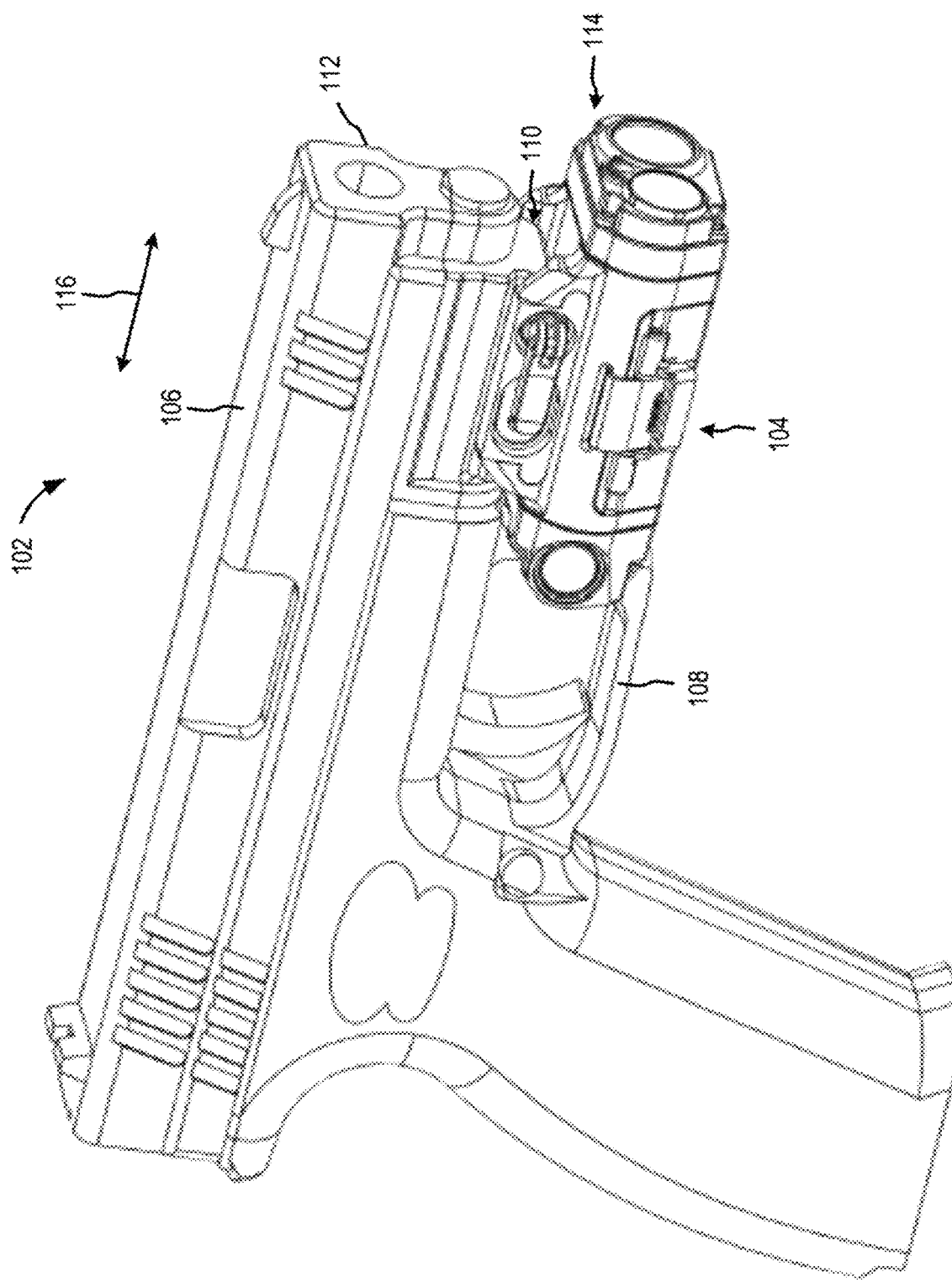
FIG. 1 depicts a perspective view of a handgun with a recording device attached thereto, in accordance with embodiments of the present disclosure.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

As the terms are used herein with respect to ranges of measurements (such as those disclosed immediately above), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

As stated above, law enforcement officers and non-law enforcement people may use body cameras and/or other types of cameras to record events when using guns, such as encounters between a gun's user and one or more third parties. In many instances, though, a law enforcement officer and/or non-law enforcement person may unintentionally block the view of the camera with his/her arms when the gun is drawn. Additionally or alternatively, the person may not activate the body camera at the appropriate time. In these instances, body cameras may not provide support that the law enforcement officer's use of the gun was justified or unjustified and/or may not record the event that the non-law enforcement person wishes to record. Stationary cameras and/or non-stationary cameras, on the other hand, may not provide the best perspective of an event, especially if a user is moving. Accordingly, body cameras suffer from many drawbacks including failure to activate at appropriate times, obstructed views depending on the positioning of the body camera and/or providing a less than desirable perspective of an event.

Embodiments of the present disclosure may overcome these limitations. In particular, the embodiments herein disclose gun-mounted recording devices. Additionally, upon determination of an event, a recording device mounted to a gun may transition from a lower-power state to a higher-power state automatically. Embodiments of the present disclosure may also have the advantage of eliminating user discretion for when/if to record an event. Furthermore, the embodiments provided herein may be used by law enforcement and non-law enforcement when no other recording device is currently being used.

As used herein, "events" may be occurrences when a gun is deployed from a previously un-deployed position. For example, an event may be when a user (e.g., law enforcement and/or non-law enforcement) deploys his/her gun from his/her holster during an encounter between the user and a third party. As another example, an event may be when a user of a gun deploys a gun from a safe and/or picks up the gun from a flat surface, a nightstand drawer, an automobile glove box, from clothing, gun case, duty belt and/or the like. However, these are only examples and not meant to be limiting. In addition, while the term "gun" is being used throughout this description, the recording device may be coupled to other devices that may not be considered guns, such as bows, crossbows and/or other devices not considered guns that shoot projectiles.

Figure 2:
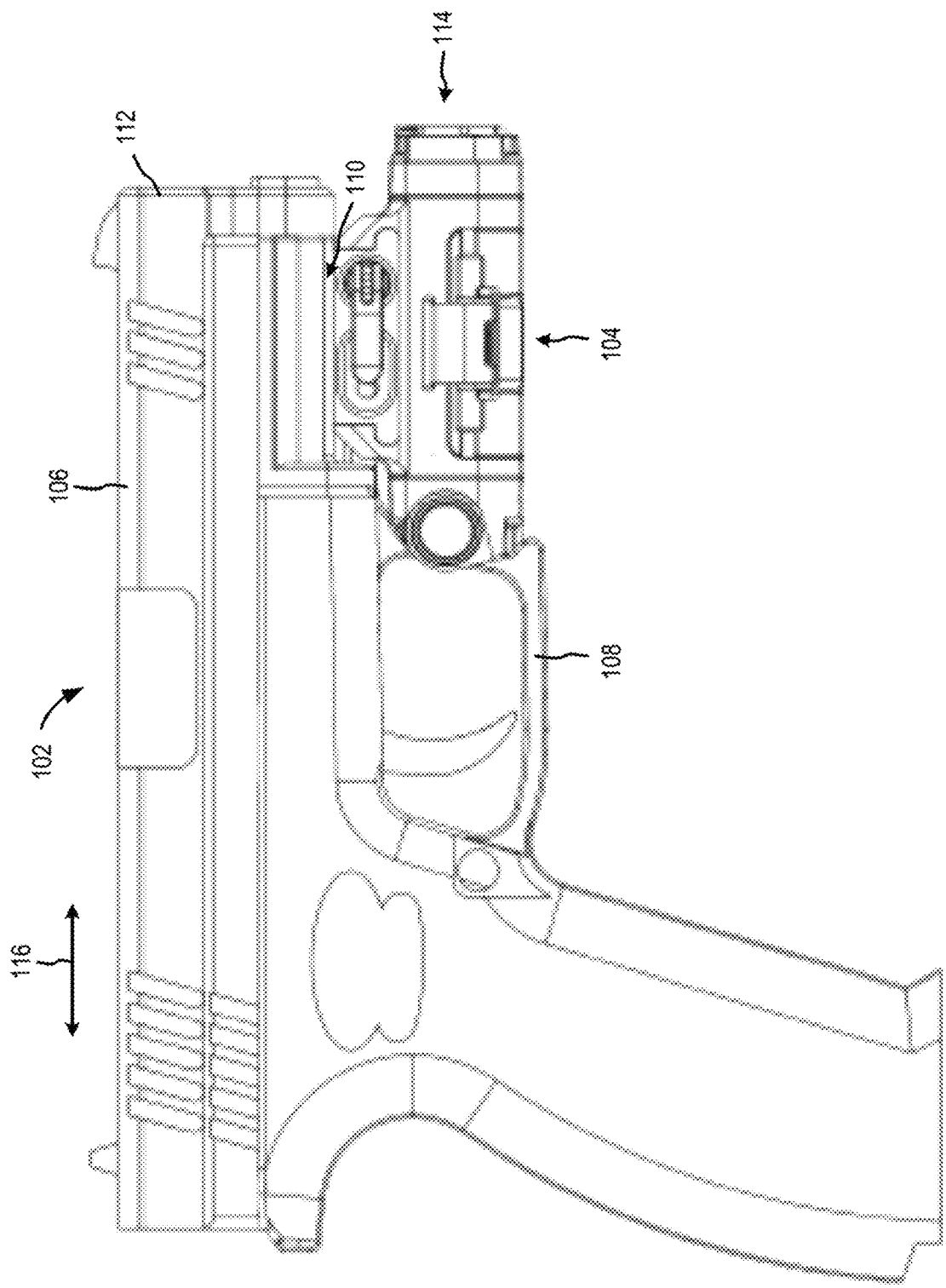
FIG. 2 depicts a left-side view of a handgun with a recording device attached thereto, in accordance with embodiments of the present disclosure.
Figure 3:
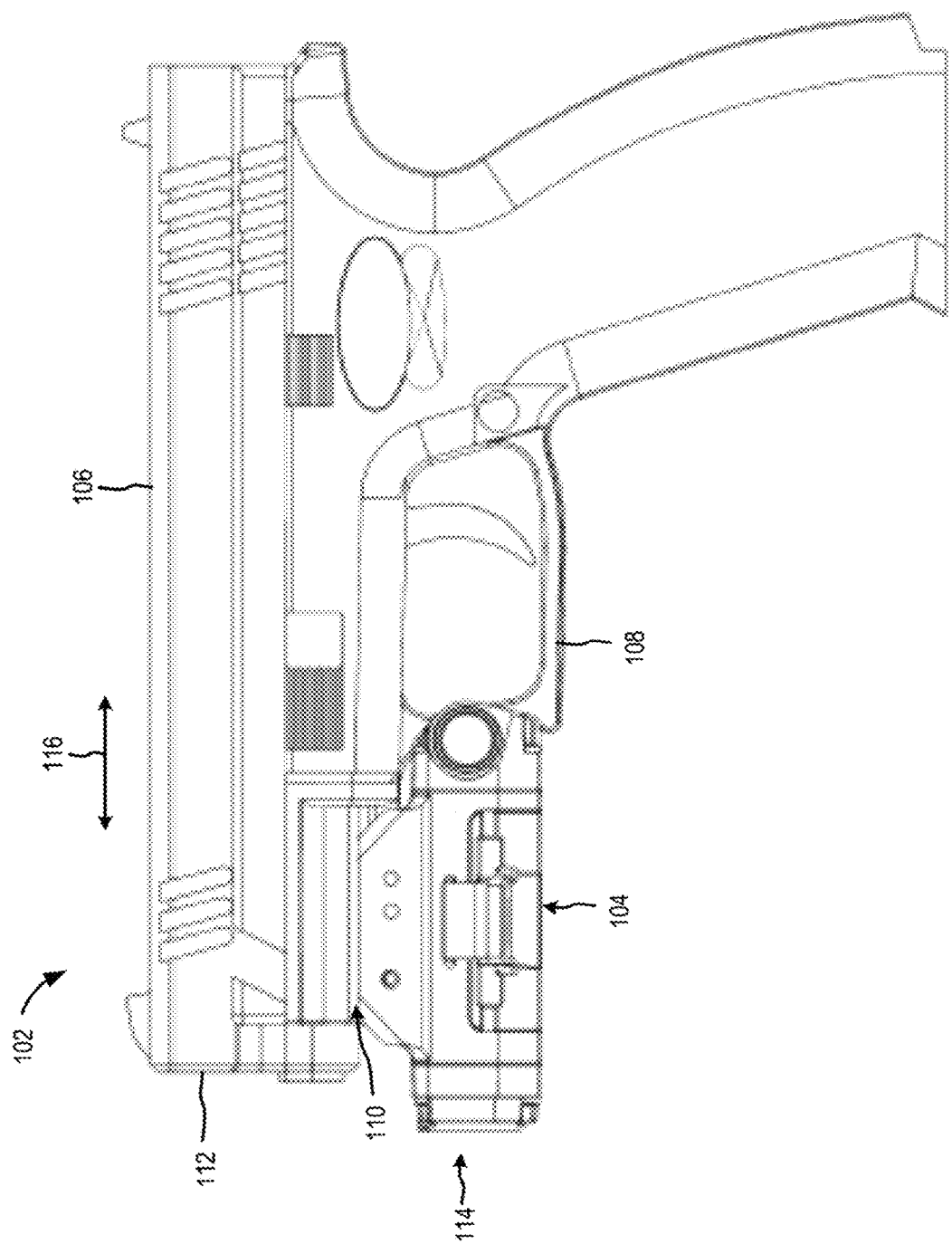
FIG. 3 depicts a right-side view of a handgun with a recording device attached thereto, in accordance with embodiments of the present disclosure.
Figure 5:
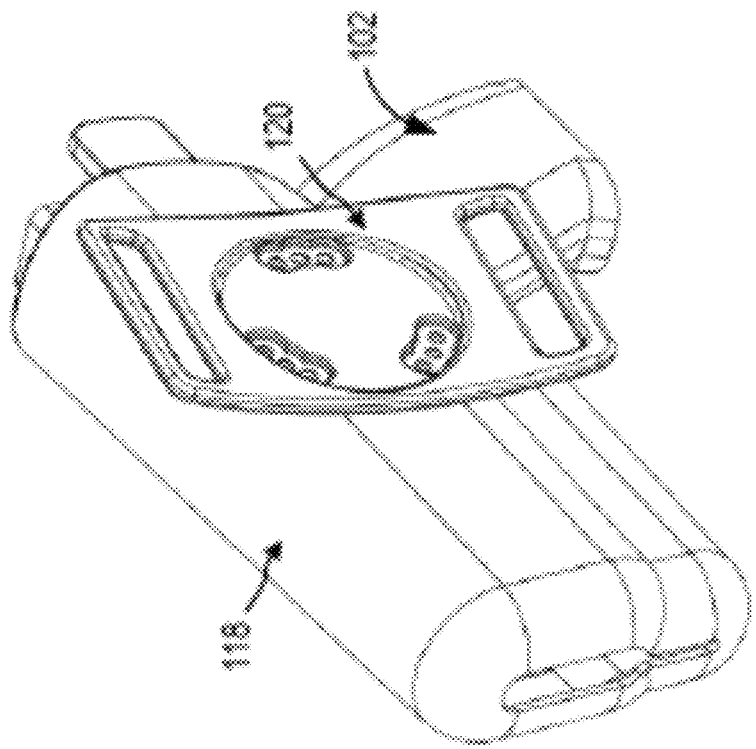
FIG. 5 depicts another perspective view of the handgun depicted in FIGS. 1-3 inserted into a holster, in accordance with embodiments of the present disclosure.
Figure 4:
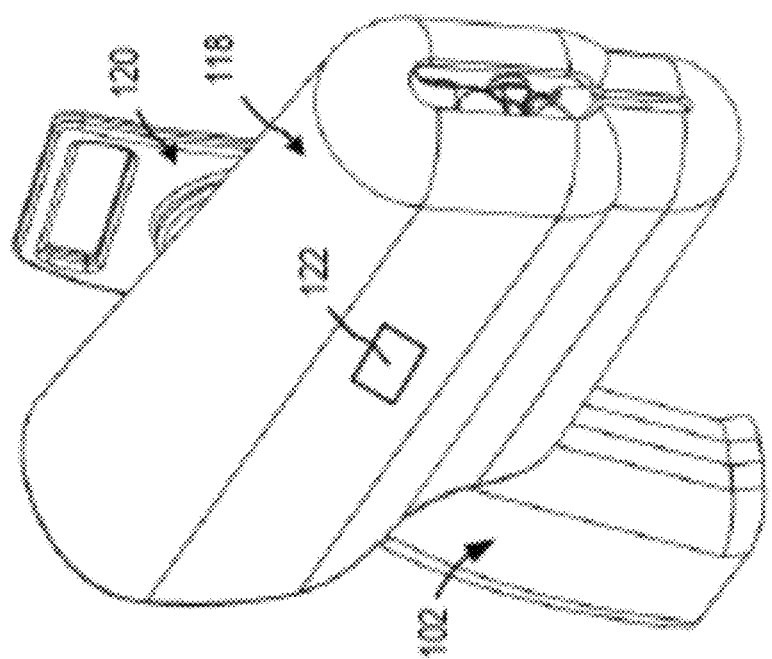
FIG. 4 depicts a perspective view of the handgun depicted in FIGS. 1-3 inserted into a holster, in accordance with embodiments of the present disclosure.
Figure 7:
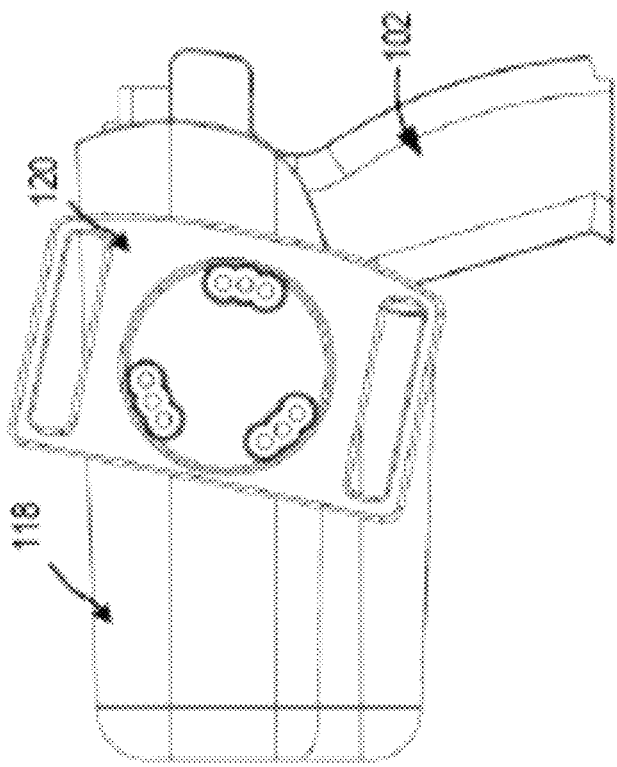
FIG. 7 depicts a right-side view of the handgun depicted in FIGS. 1-3 inserted into a holster, in accordance with embodiments of the present disclosure.
Figure 6:
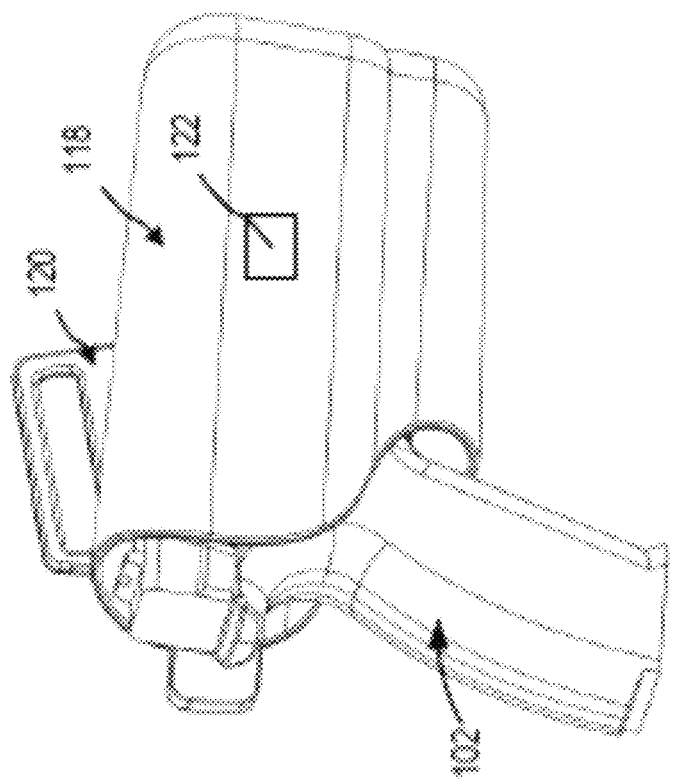
FIG. 6 depicts another perspective view of the handgun depicted in FIGS. 1-3 inserted into a holster, in accordance with embodiments of the present disclosure.
Figure 8:
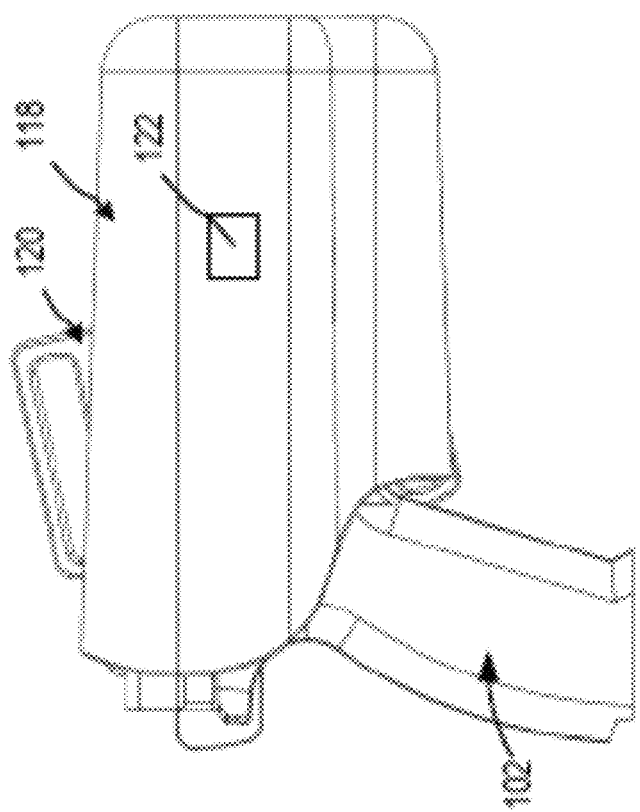
FIG. 8 depicts a left-side view of the handgun depicted in FIGS. 1-3 inserted into a holster, in accordance with embodiments of the present disclosure.

FIGS. 1-3 depict different views of a handgun 102 with a recording device 104 attached thereto, in accordance with embodiments of the present disclosure. The handgun 102 includes, among other elements and features, a barrel 106 and a trigger guard 108. In embodiments, the barrel 106 includes a rail system 110 that is configured to accommodate a variety of different accessories and attachments, including the ability to attach the recording device 104 to the rail system 110. Additionally or alternatively, the handgun 102 may include other attachment points to which the recording device 104 can be attached, for example, a trigger guard mount, a grip mount and/or other attachment points on the handgun 102. While a handgun is depicted in FIG. 1, the recording devices 104 described herein may be used with a variety of different gun styles and sizes, including handguns, rifles, shotguns and/or the like, as well as other devices not considered guns, but shoot projectiles. As such, the handgun 102 depicted in FIG. 1 is meant for illustrative purposes and not meant to be limiting.

As shown, the recording device 104 may be secured to the rail system 110 ahead of the trigger guard 108. In some embodiments, the recording device 104 is configured such that the recording device 104 does not extend beyond a muzzle end 112 of the barrel 106. In other embodiments, the recording device 104 may extend beyond the muzzle end 112. It will be appreciated that the rail system 110 may vary somewhat, depending on the type of gun used. As set forth above, while the recording device 104 is shown as attached to the rail system 110, the recording device 104 may be attached to other attachment points on the handgun 102 including, for example, a trigger guard mount, a grip mount and/or like.

In embodiments, the recording device 104 may be configured to transition from a lower-power state to a higher-power state in response to a determination that the handgun 102 is being deployed. Embodiments for determining the handgun 102 is being deployed are discussed in more detail below. Once in a higher-power state, the recording device 104 may record one or more of the following: a visual aspect, an audio aspect, a motion aspect of the gun, a temperature aspect, a pressure aspect, date, time and/or location of the recording device 104. In embodiments where the recording device 104 records a video aspect and/or an audio aspect, the recording device 104 may include a camera and/or a microphone disposed on an end 114 of the recording device 104. The camera and/or microphone disposed on the end 114 of the recording device 104 may be forward facing along a longitudinal axis 116 of the barrel 106 to sense and record video and/or audio, respectively, that is in front of the handgun 102. In embodiments, the camera and/or microphone on the end 114 of the recording device 104 may be configured to sense and record video and/or audio that is 1 foot, 5 feet, 10 feet, 25 feet, 50 feet, 100 feet and/or the like in front of the handgun 102. In embodiments, the camera on the end 114 of the recording device 104 may have a fixed focal length or include an autofocus to focus. Additionally or alternatively, the camera may include more than one camera. For example, multiple cameras may be used to record multiple views (e.g., a view of the user of the handgun 102, a view of what the user is pointing the handgun 102, side views, and/or the like). Additionally or alternatively, the multiple cameras may be configured to: record a non-zoomed-in view and a zoomed-in view and/or have different focal lengths, at different frames per second, at different resolutions, and/or the like. Further details of the recording device 104, as well as details of how the recording device 104 attaches to the handgun 102, will be discussed with respect to subsequent Figures.

FIGS. 4-8 depict different views of the handgun 102 and the recording device 104 inserted into the holster 118, in accordance with embodiments of the present disclosure. The recording device 104 is obscured by the holster 118 and cannot be seen. In embodiments, the holster 118 may include a securement portion 120 that is configured to be secured to a user's belt. Additionally or alternatively, the holster 118 may be configured to interact with the recording device 104 to releasably secure the handgun 102 within the holster 118 without engaging the trigger guard 108. In other embodiments, the holster 118 may be configured to interact with the trigger guard 108 to releasably secure the handgun 102 within the holster 118 without engaging the recording device 104. In even other embodiments, the holster 118 may be configured to interact with both the recording device 104 and the trigger guard 108 to releasably secure the handgun 102 within the holster 118.

In embodiments, upon removal of the handgun 102 from the holster 118, the recording device 104 may transition from a lower-power state to a higher-power state. For example, the holster 118 may include one or more magnets 122 that produce a magnetic field that can be detected by a sensor of the recording device 104. In embodiments, the recording device 104 may transition from a lower-power state to a higher-power state if the sensor of the recording device 104 does not sense a magnetic field that is above a threshold value. That is, if the handgun 102 is deployed from the holster 118, the magnetic field emanating from the one or more magnets 102 may no longer be able to be sensed by a sensor of the recording device 104 and, in response, the recording device may transition from a lower-power state to a higher-power state. In some embodiments, the one or more magnets 122 may be embedded within a panel of the holster 118, on an interior portion of the holster 118 and/or on an exterior portion of the holster 118. Additionally or alternatively, while one magnet 122 is depicted, more magnets may be used and/or the magnet 122 may be located at other positions of the holster 118. Additionally or alternatively to the holster 118 including one or more magnets 122, the one or more magnets 122 may be disposed on a flat surface such as the floor of a safe, a nightstand drawer, an automobile glove box and/or the like. As such, the recording device 104 may transition from a lower-power state to a higher-power state when, for example, a user of a handgun 102 deploys the handgun 102 from a safe and/or picks up the handgun 102 from a flat surface, such as a nightstand drawer, an automobile glove box and/or the like.

Additionally or alternatively to transitioning from a lower-power state to a higher-power state upon removal of the handgun 102 from the holster 118, the recording device 104 may transition from a higher-power state to a lower-power state when the handgun 102 is placed in the holster 118. For example, the recording device 104 may transition from a higher-power state to a lower-power state in response to sensing a magnetic field, emanating from one or more magnets 122, that is above a threshold value.

Additionally or alternatively to transitioning from a lower power state to higher-power state and from higher-power state to a lower-power state in response to sensing a magnetic field, the recording device 104 may transition from a lower-power state to a higher-power state when an output of one or more of the following sensors and/or switches indicates the handgun 102 is being deployed: a pressure switch, a proximity sensor, a reed switch, a motion sensor, a gyroscope, an audio sensor, a biometric sensor, and/or an accelerometer. Additionally or alternatively, the recording device 104 may transition from a higher-power state to a lower-power state when an output, of one or more of the following sensors and/or switches, indicates the handgun 102 is in an un-deployed state: a pressure switch, a proximity sensor, a reed switch, a motion sensor, a gyroscope, an audio sensor, a biometric sensor, and/or an accelerometer. In embodiments, the sensor and/or switch may be located on the recording device 104 and/or on any other position on the handgun 102 that facilitates determining the handgun 102 is in a deployed state and/or an un-deployed state.

In embodiments, the audio sensor may respond only to a specific voice, sound, and/or word. That is, a user may train the audio sensor to respond to a specific voice, sound, and/or word. Additionally or alternatively, the biometric sensor may only respond to specific biometric indicators, for example, fingerprint, palm print, facial features, eye, iris, retina, voice, venous pattern, and/or the like. Similar to the audio sensor, a user may train the biometric sensor to respond to a specific biometric indicator.

Figure 9:
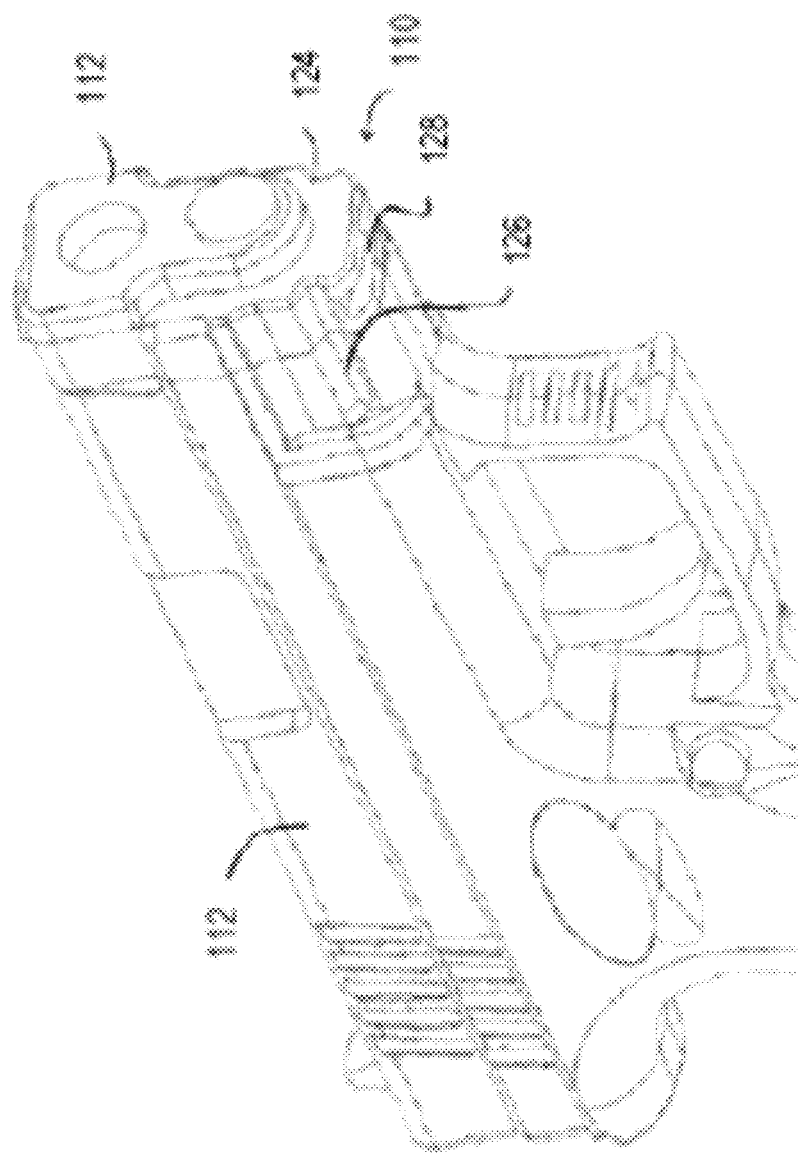
FIG. 9 depicts a portion of the handgun depicted in FIGS. 1-3 without the recording device 104 coupled thereto, in according with embodiment of the present disclosure.
Figure 10:
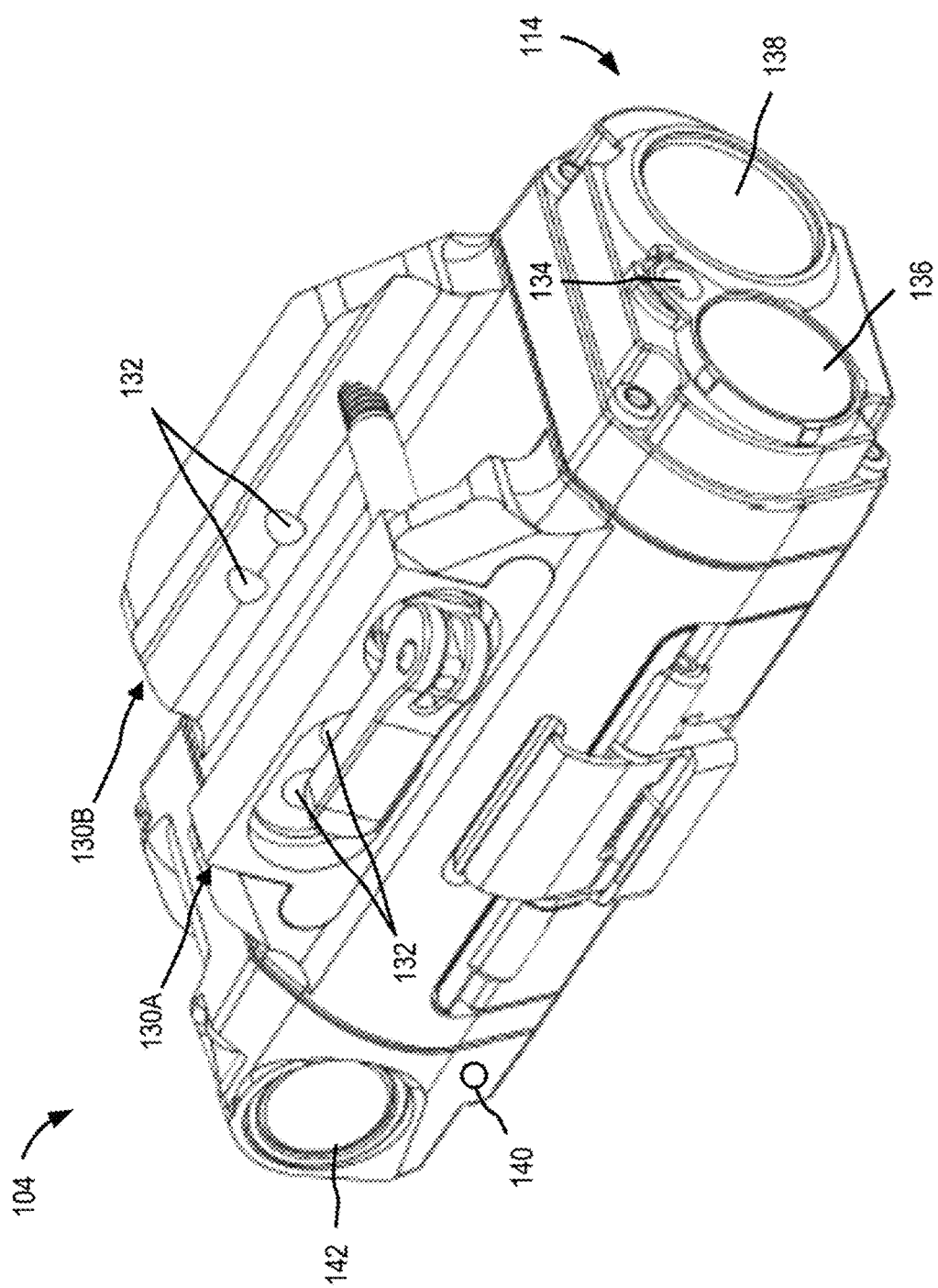
FIG. 10 depicts a perspective view of a recording device and rail set attached thereto, in accordance with embodiments of the present disclosure.
Figure 11:
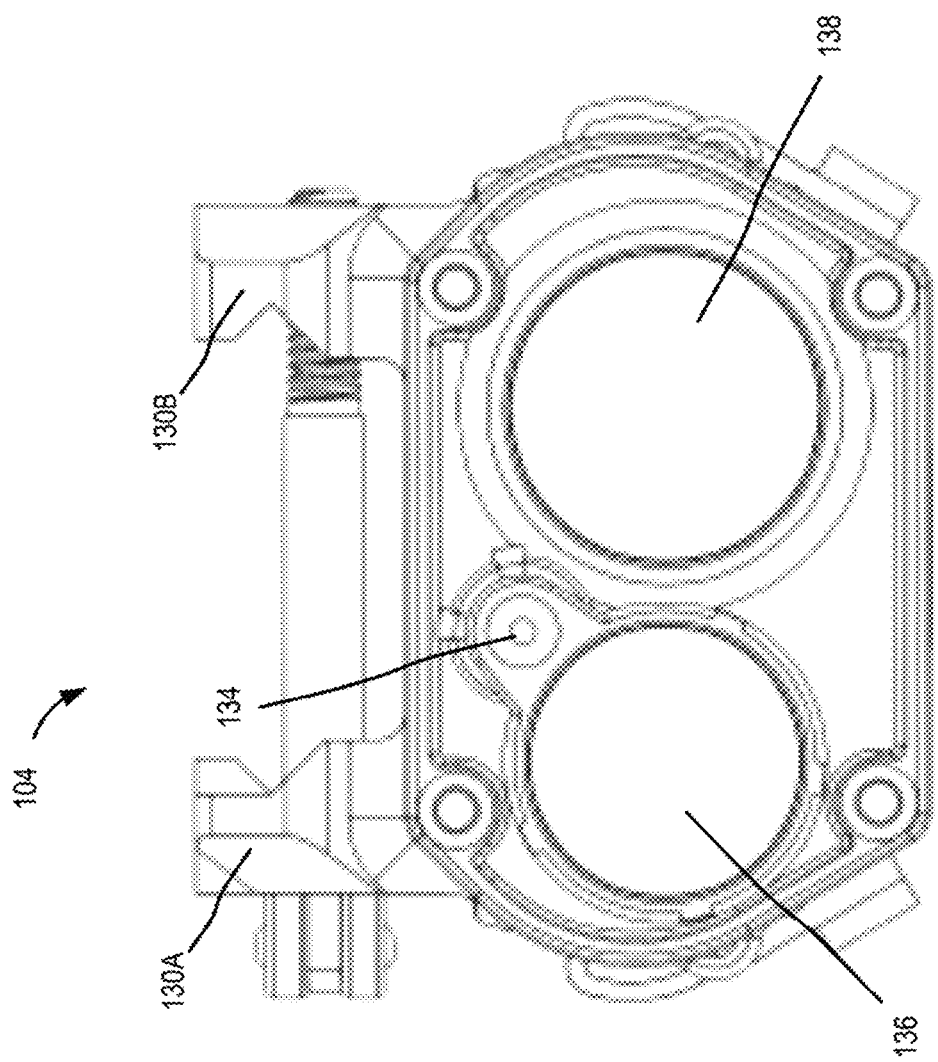
FIG. 11 depicts a front view of the recording device and the rail set attached thereto, in accordance with embodiments of the present disclosure.
Figure 12:
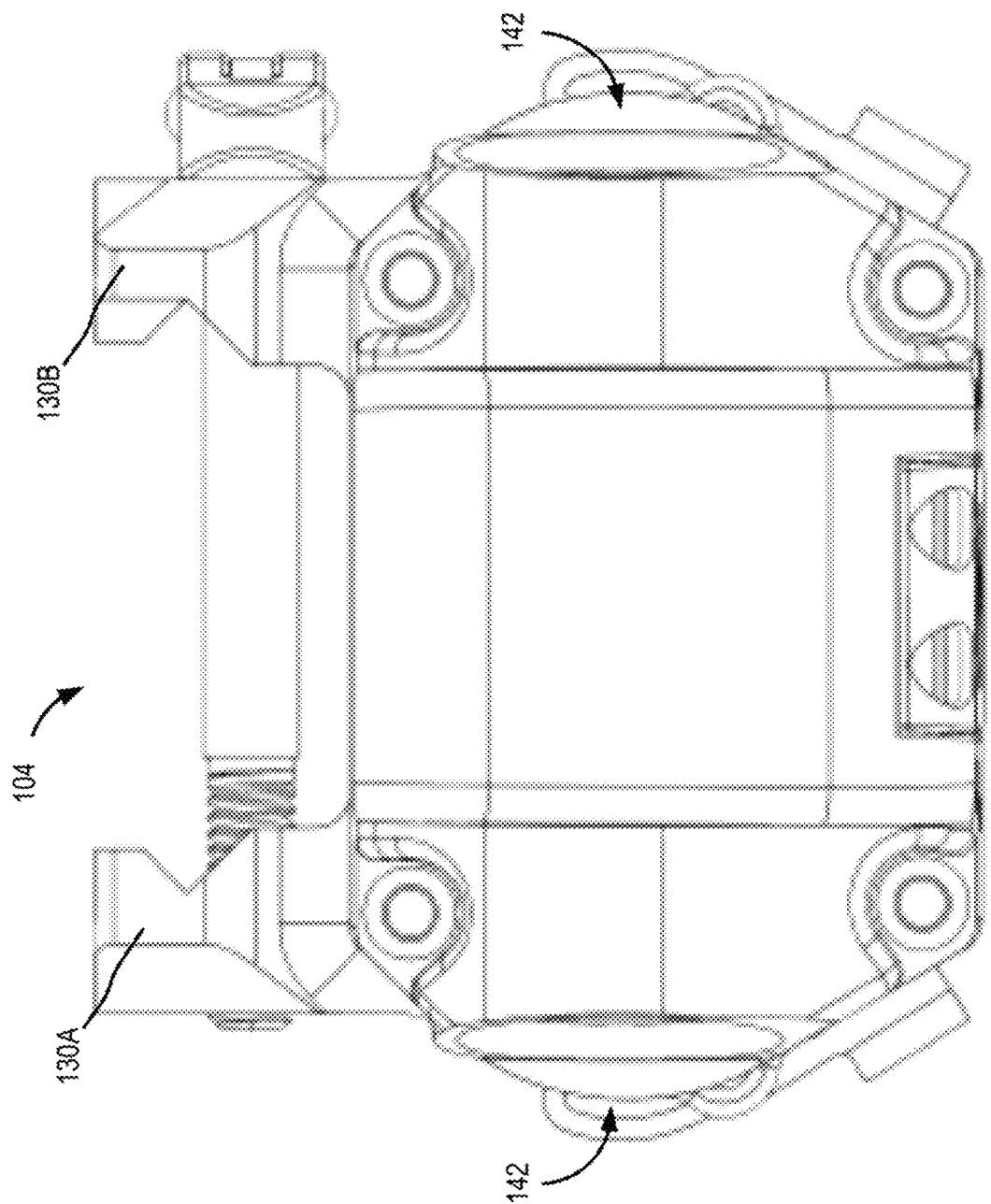
FIG. 12 depicts a back view of the recording device and the rail set attached thereto, in accordance with embodiments of the present disclosure.

FIG. 9 depicts a portion of the handgun 102 without the recording device 104 coupled thereto, in which the rail system 110 includes a left profile 124 (in the illustrated orientation) and a corresponding right profile 126. In embodiments, the rail system 110 also includes a horizontal cross slot 128. In embodiments, the rail system 110 may be used in combination with a rail set 130A, 130B attached to the recording device depicted in FIGS. 10-17.

FIGS. 10-17 depict different views of the recording device 104, in accordance with embodiments of the present disclosure. In the embodiment shown, the recording device 104 includes a rail set 130A, 130B. In some embodiments, the rail set 130A, 130B includes a left portion 130A and a right portion 130B that are configured to engage the left profile 124 and the right profile 126 of the rail system 110. In some embodiments, as illustrated, the rail set 130A, 130B may include mounting apertures 132 that permit the cross pins (not shown) to extend through the apertures 132 and secure the rail set 130A, 130B to the rail system 110. In some embodiments, the rail system's 110 horizontal cross slot 128 is sized and positioned to accommodate cross pins that extend through the apertures 132 and thereby prevent or at least substantially prevent lateral movement of the recording device 104 relative to the handgun 102. In some embodiments, the rail set 130A, 130B may include several different mounting apertures to accommodate handguns 102 having different positions for the horizontal cross slot 128. As such, it will be appreciated that the recording device 104 may be attached to a variety of different guns or handguns 102 without requiring alteration of the recording device 104. Rather, the rail set 130A, 130B may be configured to have mounting surfaces that are configured to interact with the particular rail system 110 of a particular gun 102. Further details of embodiments of mounting devices for a gun are disclosed in, for example, U.S. patent application Ser. No. 14/583,342, entitled "Gun Holster and Electronic Assembly," which is hereby incorporated by reference in its entirety. Additionally or alternatively, the recording device 104 may be mounted to the handgun 102 via other methods, such using a trigger guard mount and/or a grip mount. This recording device 104 could be integrated into the gun.

As stated above, the recording device 104 may include a recording module 134 configured to record one or more of the following: a visual aspect, an audio aspect, a motion aspect of the gun, a temperature aspect, a pressure aspect, date, time and/or location of the recording device 104. In embodiments, the recording module 134 may begin or cease recording in response to one or more signals, as described in more detail below.

In embodiments where the recording module 134 is configured to record a visual aspect, the recording module 134 may be a video camera with a lens disposed on an end 114 of the recording device 104. In embodiments, the recording module 134 may be configured to focus at different distances, record at different frames per second, record at different resolutions, and/or the like. To capture video in low light, the recording device 104 may include a light-emitting diode 136 (LED) (or other type of lighting device) that is capable of illuminating areas in front of the recording device 104. Additionally or alternatively, the video camera may be configured to capture video in low light with or without the use of the LED 136. Additionally or alternatively, the recording device 104 may be configured to include a time stamp on any recordings. The time stamp may indicate a local time that the recording was recorded.

Additionally or alternatively, the recording device 104 may include a laser that facilitates aiming of a gun (or other device configured to shoot a projectile) to which the recording device 104 is attached. In embodiments, the recording device 104 may include a green, red, blue and/or other color laser sight(s) for determining where the handgun 102 and/or the recording device 104 are pointed. An example of a green laser light that may be incorporated into the recording device 104 is disclosed in U.S. patent application Ser. No. 13/720,083, entitled "Auto On Green Laser Sight," which is hereby incorporated by reference in its entirety.

Additionally or alternatively, the recording device 104 may include a microphone for recording an audio aspect, a temperature sensor for sensing a temperature of the environment of the recording device 104, a pressure sensor for sensing a pressure of the environment of the recording device 104, one or more motion sensors (e.g., gyroscopes, accelerometers and/or the like) for sensing motion of the recording device 104, one or more sensors for measuring times and/or dates, one or more sensors for recording biometric indicators, and/or one or more location sensors (e.g., a GPS receiver) for measuring the location of the recording device 104. In embodiments, the pressure sensor for sensing pressure of the environment of the recording device 104 may be a different than the pressure sensor used for determining whether or not the handgun 102 is deployed or un-deployed.

To power the recording device 104, the recording device 104 may include an onboard power source 138 (e.g., a battery). In embodiments, the power source 138 may be replaceable, rechargeable and/or removable. Additionally or alternatively, the power source 138 may be a customized power source 138 and may include spring contacts that allow the power source 138 to be removable. In embodiments where the power source 138 is rechargeable, the power source 138 may be recharged via a wire (e.g., via a power cord coupled to the recording device 104 and/or the power source 138) and/or may be recharged wirelessly, (e.g., inductively or capacitively). Additionally or alternatively, the power source 138 may be removable and coupled with a base station to recharge the power source 138.

In embodiments, the recording device 104 may also include an indicator 140 disposed on the left side and/or right side of the recording device 104. The indicator 140 may indicate the remaining amount of power of the power source 138 and/or how much memory is left for recording video, sound, etc. Additionally or alternatively, the indicator 140 may indicate whether the recording device 104 is recording. As examples, the indicator 140 may be a light that is capable of displaying different colors (e.g., green, yellow and red) and/or different light sequences, which indicate whether the recording device 104 is recording and/or the remaining amount of power of the power source 138. For example, light being emitted from the indicator may indicate that the recording device 104 is recording. As another example, a green light displayed by the indicator 140 may indicate that the power source 138 has enough power left to power the recording device 104 for a first threshold amount of time (e.g., 1 hour, 2 hours, 6 hours, 12 hours and/or the like). A yellow light displayed by the indicator 140 may indicate that the power source 138 has enough power to power the recording device 104 a second threshold amount of time (e.g., 10 minutes, 20 minutes, 30 minutes, 1 hour, 2 hours and/or the like), but not enough power to power the recording device 104 for the first threshold amount of time (e.g., 1 hour, 2 hours, 6 hours, 12 hours and/or the like). A red light displayed by the indicator 140 may indicate that the power source 138 does not have enough power to power the recording device 104 for the second threshold amount of time (e.g., 10 minutes, 20 minutes, 30 minutes, 1 hour, 2 hours and/or the like). Additionally or alternatively, some functions of the indicator 140 may be incorporated into the handgun 102 (e.g., indicator lights on the back of the gun) to facilitate viewing of the indications.

In embodiments, one or more thresholds (e.g., the first threshold and/or the second threshold) may correspond to average shift times for a police officer and/or, in embodiments, assume an average amount of use over the corresponding time periods. For example, a green light may indicate that the power source 138 has enough power to power the recording device 104 for the entirety of an average police officer shift if the recording device 104 is used an average amount during the entirety of the shift. The average amount of use may correspond to the recording device 104 spending an average amount of time spent in a lower-power state and/or an average amount of time in a higher-power state. These states are described in more detail below in relation to FIG. 18. As another example, the yellow light may indicate that the power source 138 has enough power to power the recording device 104 for half the average shift duration if the recording device 104 is used an average amount during the entirety of the shift. And, a red light may indicate that the power source 138 needs to be either replaced and/or recharged before the police officer begins his/her shift.

In embodiments, the recording device 104 may include two modes: one mode where a user cannot modify one or more settings of the recording device 104 (e.g., when the recording device 104 records) and another mode where a user can modify one or more of the settings of the recording device 104. In the embodiments where a user cannot modify one or more settings of the recording device 104, one or more settings of the recording device 104 may only be modified by an administrator. Additionally or alternatively, while a user may not be able to modify one or more settings, the user may be able to view and/or listen to the recordings, but may not be able to modify the recordings.

In embodiments, the recording device 104 may include one or more user interface buttons 142 disposed on the left side and/or right side of the recording device 104. A user interface button 142 may provide a user and/or administrator, depending on the mode of the recording device 104, with the ability to program and/or modify the functionality of the recording device 104. For example, the user interface button 142 may provide an administrator the ability to determine when and how the recording device 104 records, how long the recording device 104 records and/or the like. Additionally or alternatively, the user interface button 142 may control the operation of the LED 136 and/or other functions included in the recording device (e.g., a microphone, a temperature sensor, a pressure sensor, audio sensor, biometric sensor, and/or a laser gun sight). In some embodiments, some functions of the user interface button 142 may be controllable by a non-administrator while others may only be controllable by an administrator. For example, recording aspects of the recording device 104 (e.g., when and how long the recording device 104 records) may only be controllable by an administrator while a non-administrator may be able to control a laser and/or light of the recording device 104. In some embodiments, the interface button 142 may be replaced by a touchscreen or other user interface. In some embodiments, before being able to modify one or more settings of the recording device 104, a specific code and/or other authorizing indicia (e.g., a biometric identifier) may need to be entered into the user interface button 142 before the user has the ability to modify the functionality of the recording device 104. This may prevent some users from controlling the settings of the recording device 104, while still allowing other users (e.g., administrators) to have access to the settings of the recording device 104. Additionally or alternatively, some functions of the interface button 142 may be replaced and/or replicated by an application on a smartphone.

Figure 15:
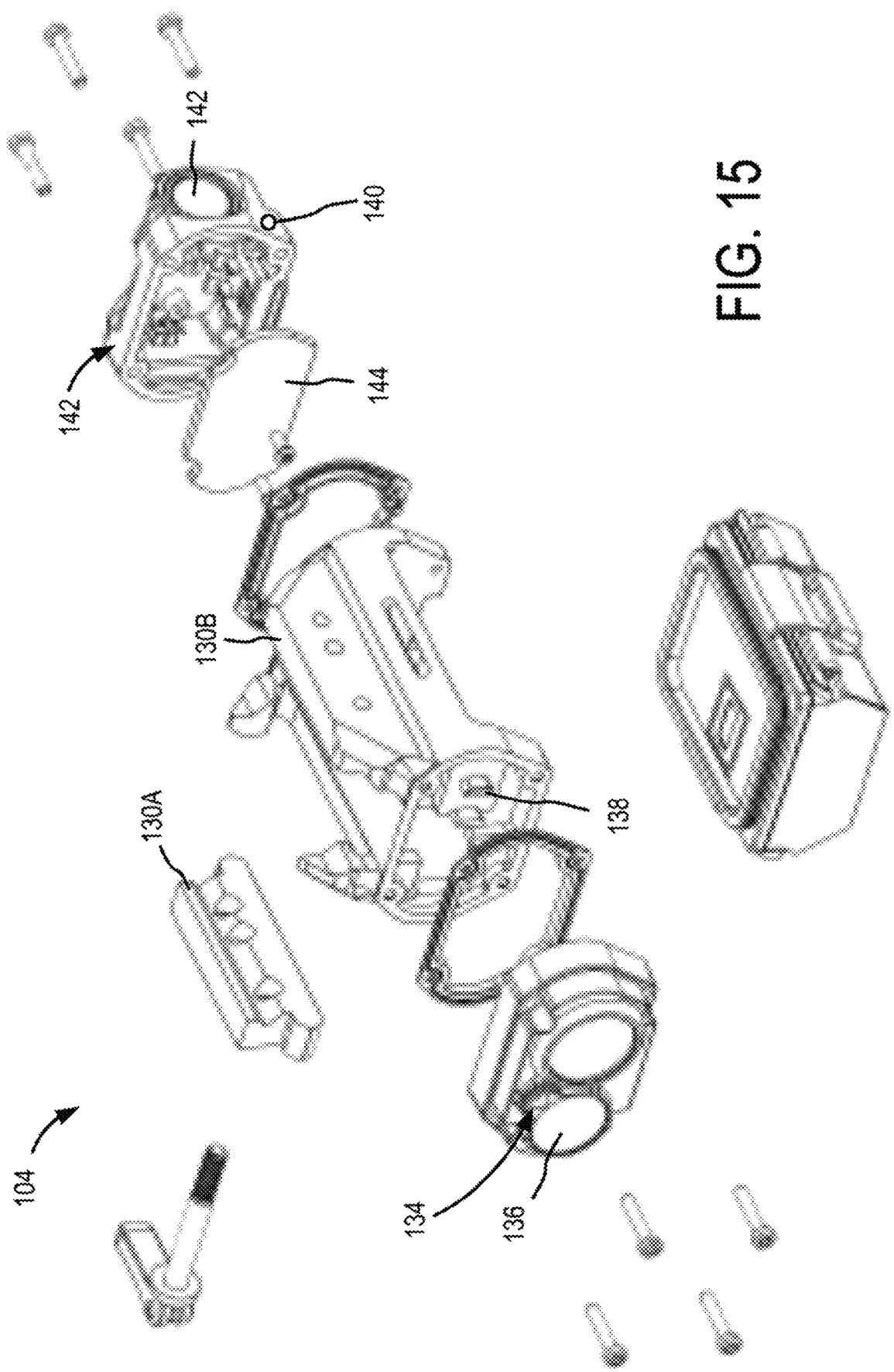
FIG. 15 depicts an exploded perspective view of the right side of the recording device and the rail set attached thereto, in accordance with embodiments of the present disclosure.
Figure 16:
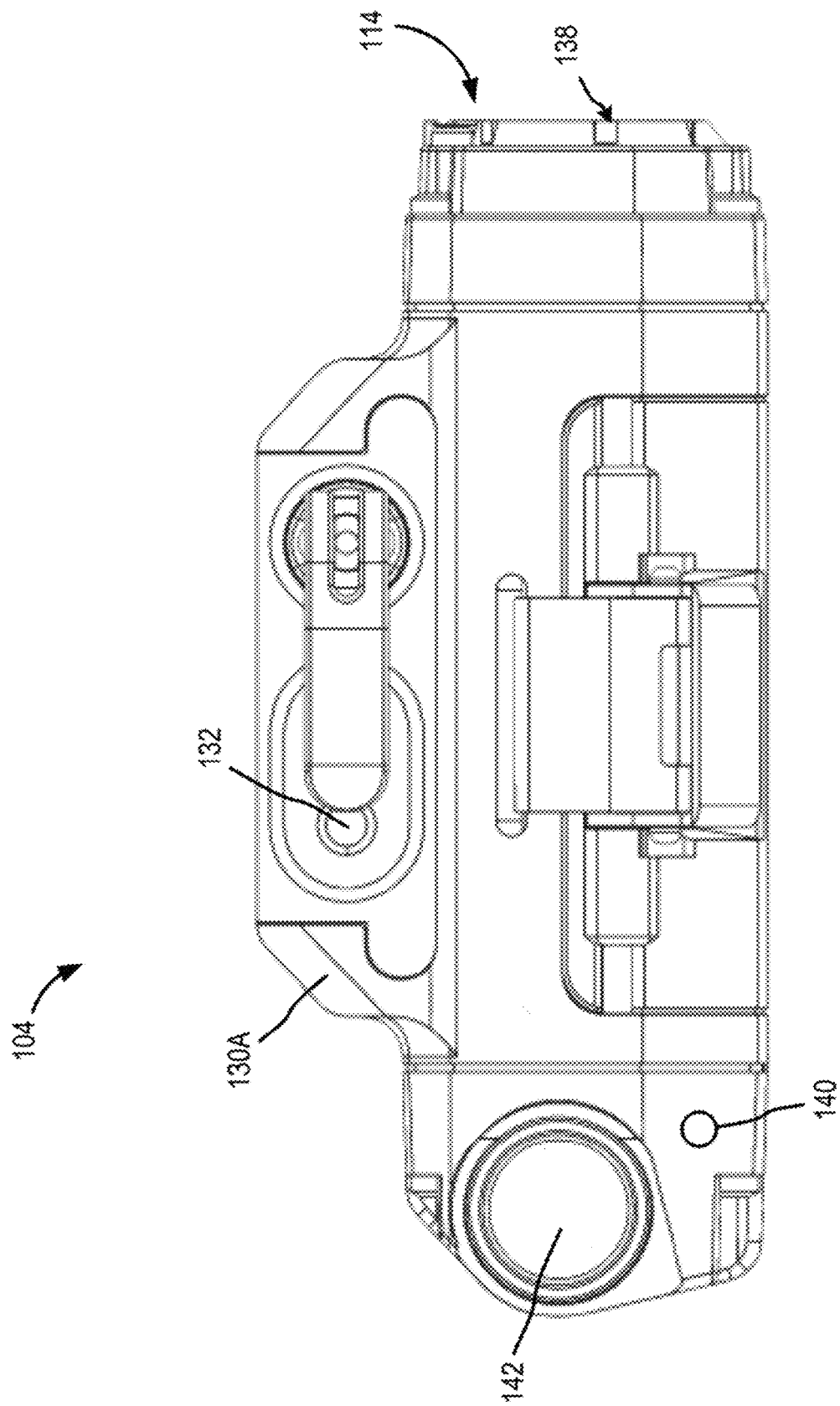
FIG. 16 depicts a left side view of the recording device and the rail set attached thereto, in accordance with embodiments of the present disclosure.
Figure 17:
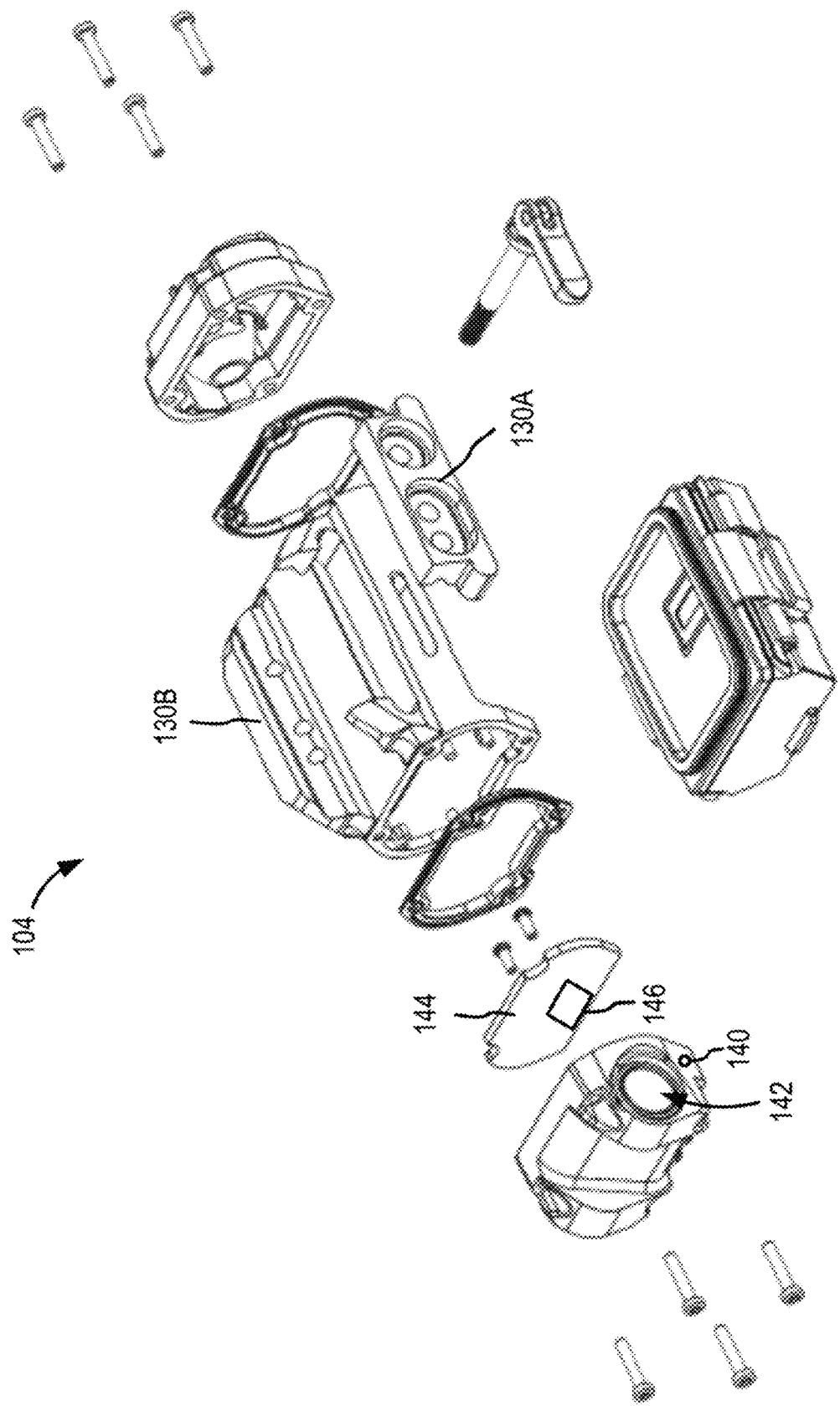
FIG. 17 depicts an exploded perspective view of the left side of the recording device and the rail set attached thereto, in accordance with embodiments of the present disclosure.

The recording device 104 may also include a processing device 144, as depicted in FIGS. 15 and 17. The processing device 144 may control the functionality of the recording device 104, as described below in relation to FIGS. 18 and 19. Additionally, in embodiments, the recording device 104 may include memory (not shown) to store any data recorded by the recording device 104.

Additionally or alternatively, a sensor 146, as depicted in FIG. 17, may be coupled to the processing device 144. The sensor 146 may be, for example, a Hall-effect sensor that detects a magnetic field strength from, for example, the magnet 122, a motion sensor (e.g., an accelerometer and/or gyroscope), a pressure sensor, a proximity sensor, an audio sensor, a reed switch, and/or the like. In embodiments, the sensor 146 may be configured to sense when the gun 102 is deployed and/or not deployed. For example, the sensor 146 may be configured to sense when the gun 102 is positioned, for example, within the holster 118 and/or when the gun 102 is not in use. In these embodiments, the processing device 144 may transition from a higher-power state where the recording device 104 is recording to a lower-power state where the recording device 104 is not recording, in response to receiving a signal from the sensor 146 indicating the gun 102 is positioned within the holster 118 and/or not in use. Conversely, the processing device 144 may transition from a lower-power state to a higher-power state where the recording device 104 is recording in response to the sensor 146 sensing the gun is not positioned within the holster 118 and/or when the gun 102 is deployed. These embodiments are discussed in more detail below in relation to FIG. 18.

Figure 13:
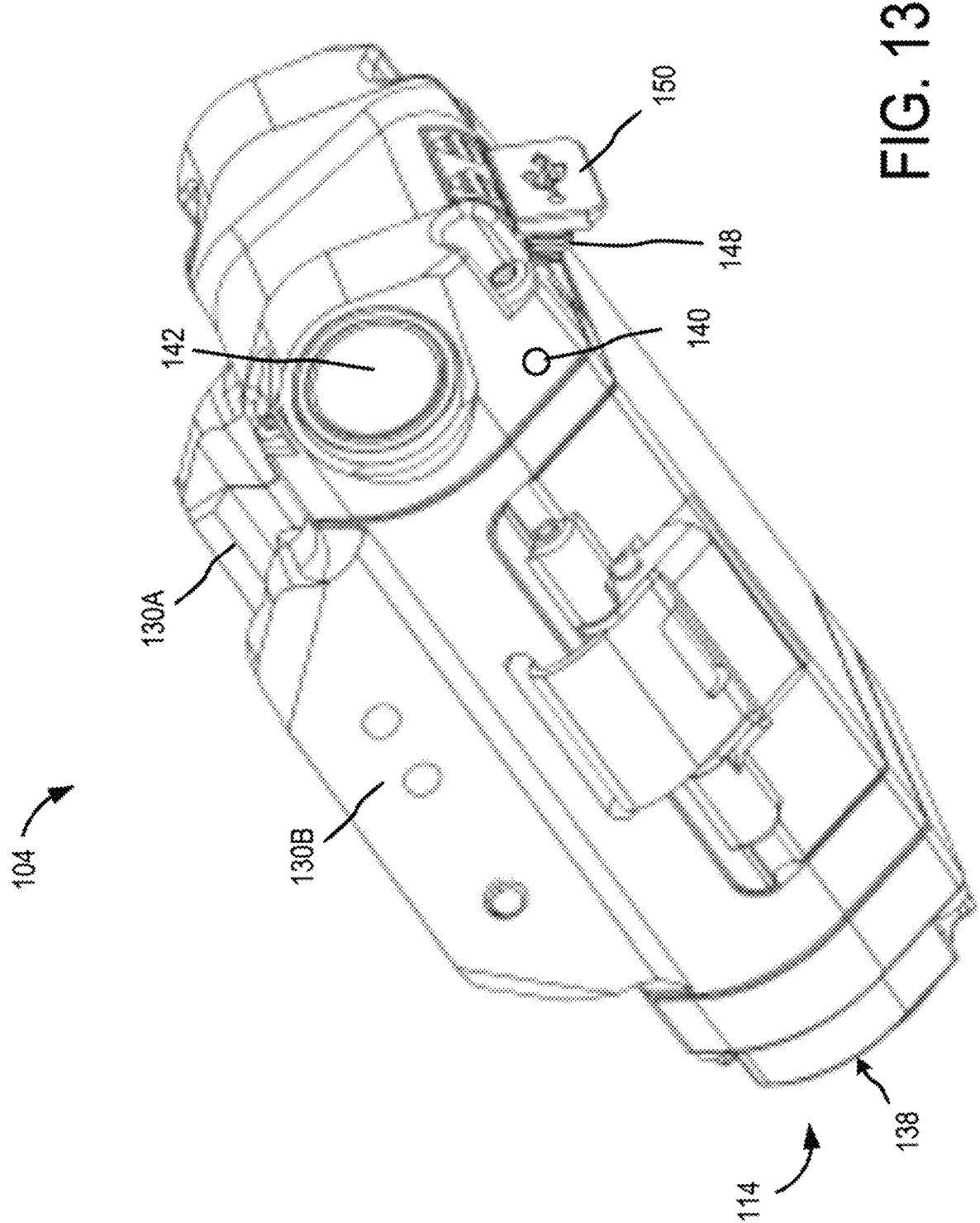
FIG. 13 depicts a bottom perspective view of the recording device and the rail set attached thereto, in accordance with embodiments of the present disclosure.
Figure 14:
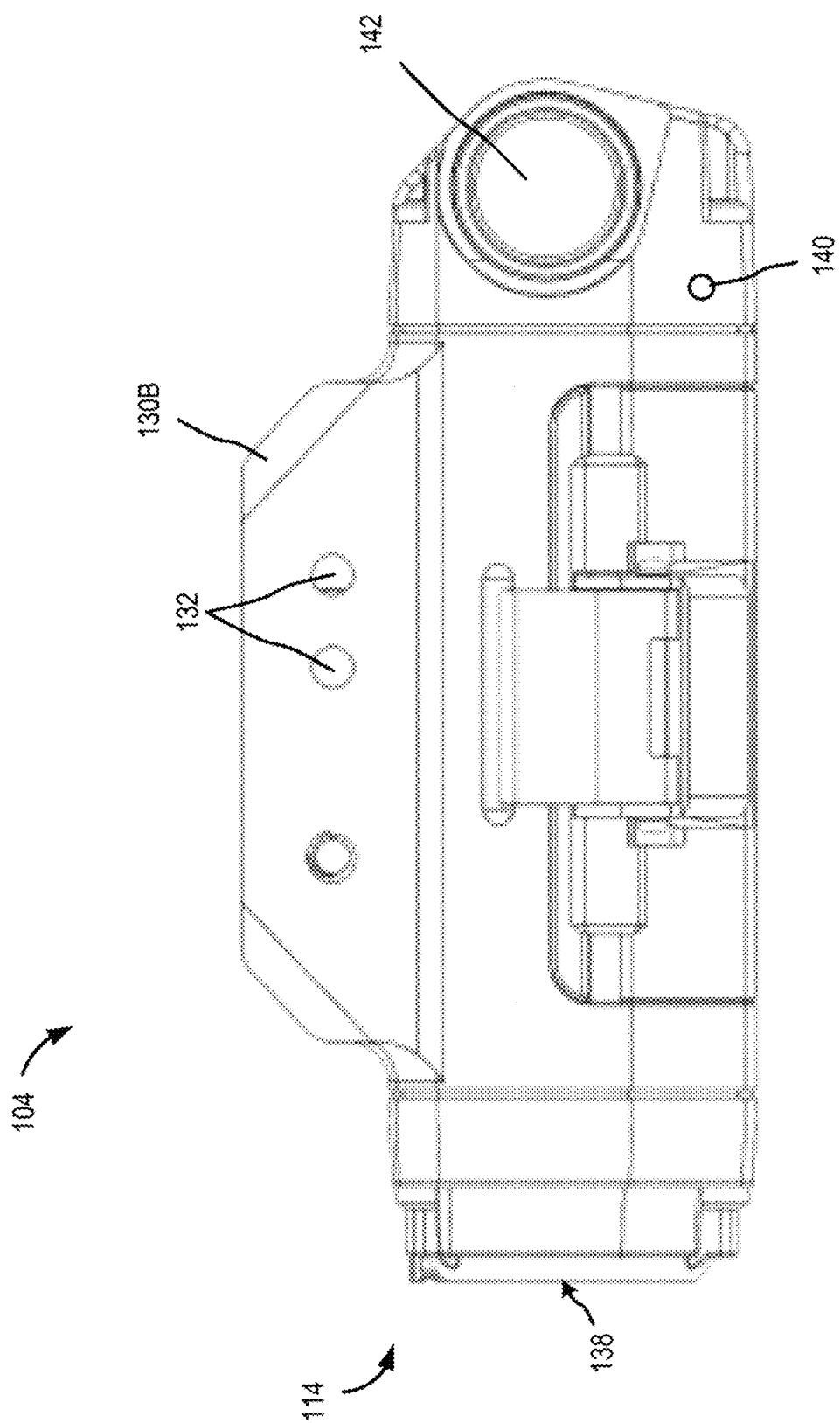
FIG. 14 depicts a right side view of the recording device and the rail set attached thereto, in accordance with embodiments of the present disclosure.

In embodiments, the recording device 104 may include a data port 148, as depicted in FIG. 13, for transferring data to and from the recording device 104. In embodiments, a cover 150 may cover the data port 148 when the data port 148 is not being used to prevent the data port 148 from being damaged by, for example, debris. Additionally or alternatively, the recording device 104 may include a receiver and/or transmitter (not shown) for wireless receiving and/or transmitting data to and from the recording device 104. In embodiments, the data port 148, receiver and/or transmitter may be configured to transmit data at certain time increments, upon demand, after an event is recorded and/or after the memory of the recording device 104 has less than a threshold amount of open space available for future recordings. In embodiments, the data port 148 and/or data management system of the recording device 104 may be compatible with existing law enforcement and/or other data management systems.

Figure 18:
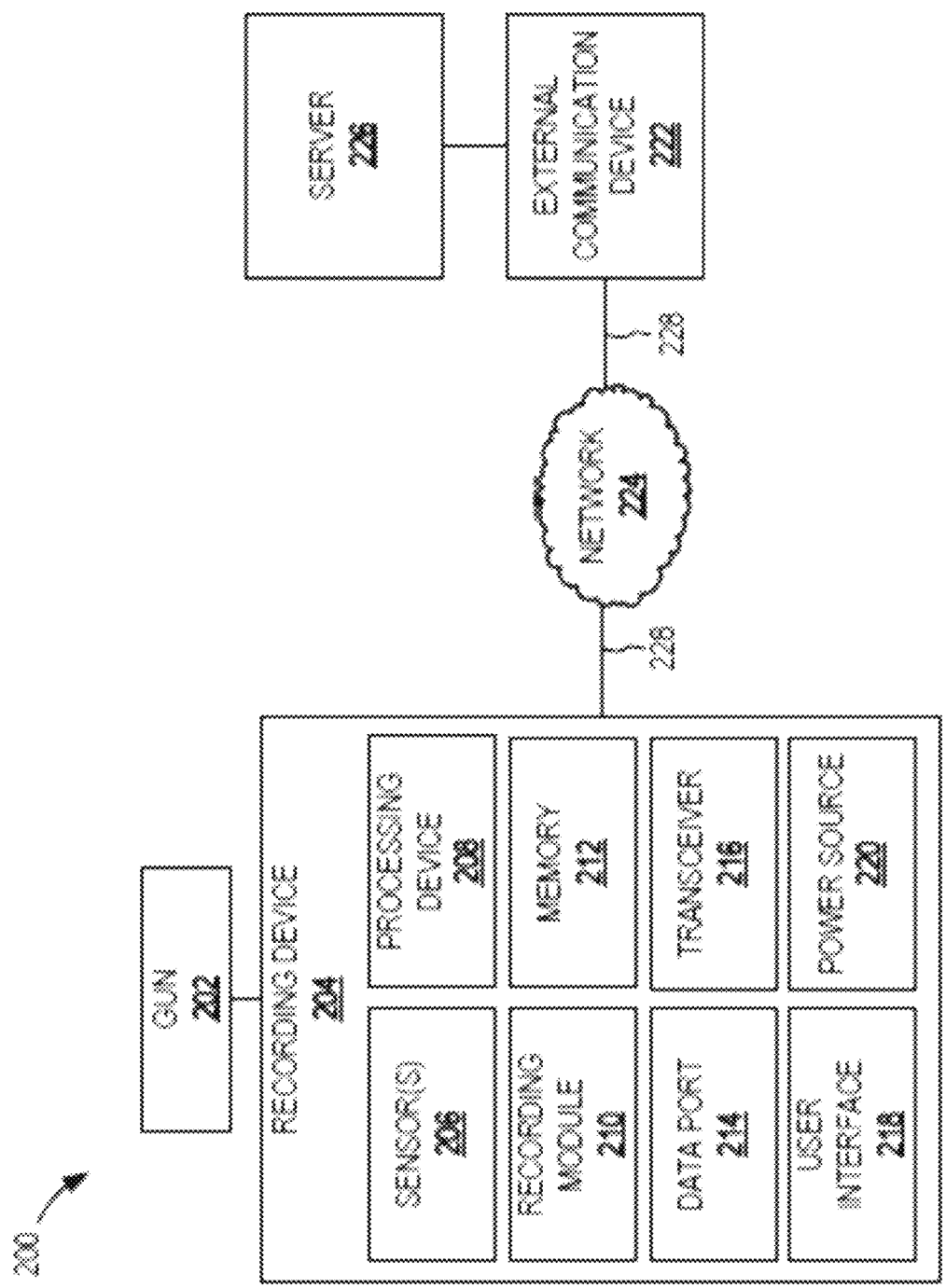
FIG. 18 is a block diagram of an embodiment of a system including a gun and a recording device with auto mounted thereto, in accordance with embodiments of the present disclosure.
Figure 19:
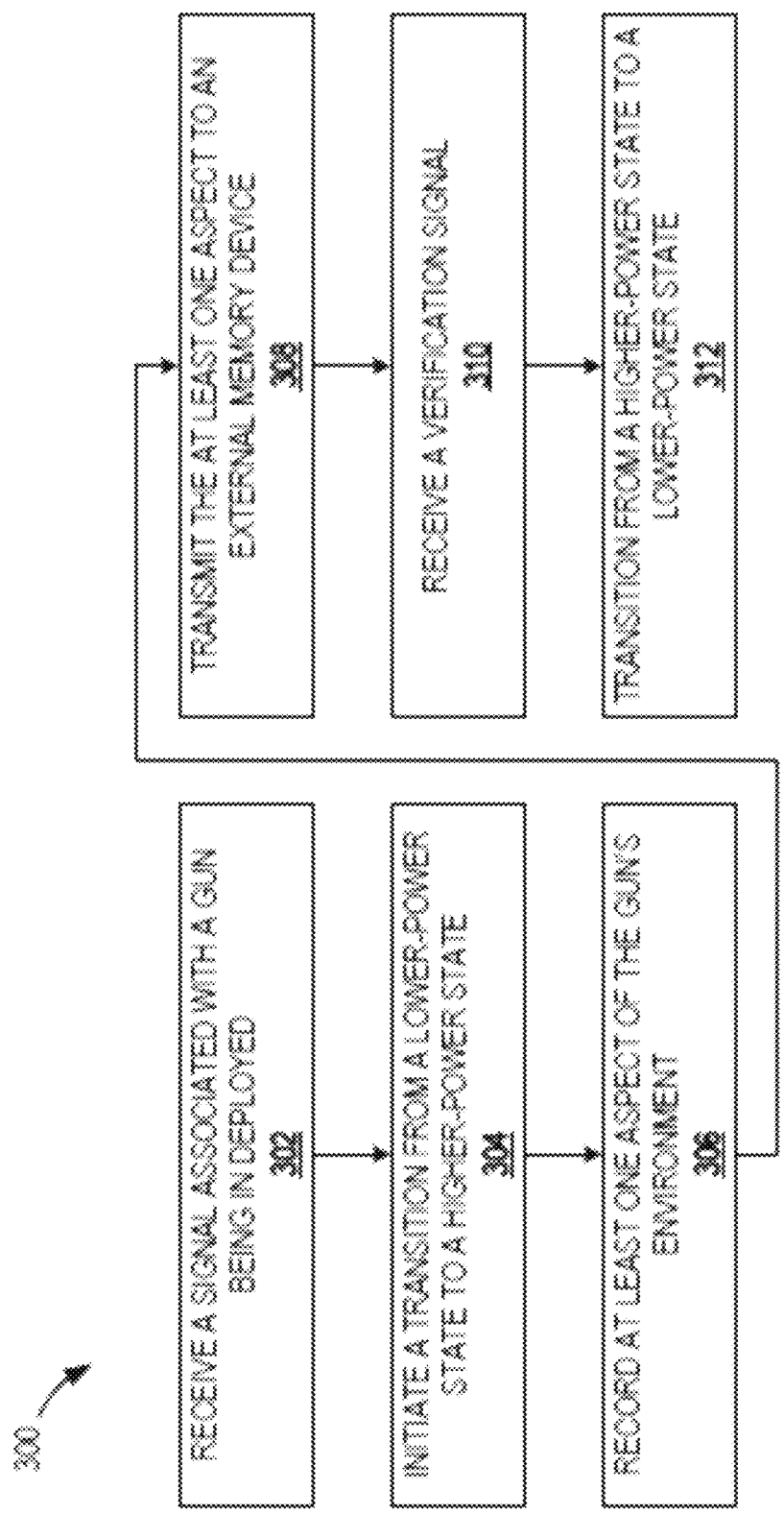
FIG. 19 is a flow diagram of an example method for operating a gun-mounted recording device with auto on, in accordance with embodiments of the present disclosure.

FIG. 18 is a block diagram of an embodiment of a system 200 including a gun 202 and a recording device 204 mounted thereto, in accordance with embodiments of the present disclosure. In embodiments, the gun 202 may be a handgun, a rifle, a shotgun, a device for shooting a projectile, and/or the like. The recording device 204 may have some or all of the same functionality as the recording device 104 depicted in FIGS. 1-17; conversely, the recording device 104 depicted in FIGS. 1-17 may have some or all of the same functionality as the recording device 204 depicted in FIG. 18. For example, the recording device 204 may be mounted to the gun 104 using a rail mounting system (e.g., the rail system 130 depicted in FIG. 9.) Additionally or alternatively, the recording device 204 may be mounted to the gun using other methods known in the art, such as a trigger guard mount and/or a grip mount.

In embodiments, the recording device 202 may include one or more of the following components: one or more sensors 206, a processing device 208, a recording module 210, memory 212, a data port 214, a transceiver 216, a user interface 218 and/or a power source 220. While the above components 206-220 are depicted as being included in the recording device 204, one or more of the components 206-220 may be located external to the recording device 204.

In embodiments, the sensor(s) 206 may be configured to sense a signal that corresponds to the gun 202 being deployed. As indicated above, to be deployed, the gun 202 does not have to be fired. Instead, the gun 202 may be deployed if it is withdrawn from a holster and/or safe, picked up from a surface (e.g., a nightstand drawer, automobile glove box and/or the like), activated via an audio command, activated via a biometric indicator, moved in such a way that would indicate that a user is using the gun 202, such as pointing the gun 202 at a target, in the vicinity of a target, moving the gun in a defensive manner and/or for an expected engagement, and/or in a direction in which the user believes there to be a target.

As an example, to determine that the gun 202 has been deployed, the sensor(s) 206 may sense whether the sensor(s) 206 is in the presence of a magnetic field of a sufficient strength. That is, a magnet (e.g., the magnet 122 depicted in FIGS. 4, 6, 8) may be disposed on or in a holster, safe and/or surface. When the sensor(s) 206 is within a certain distance of the magnet, the sensor(s) 206 will sense a magnetic field of a designated strength. Alternatively, when the sensor(s) 206 is moved a sufficient distance away from the magnet, the sensor(s) 206 will no longer sense a magnetic field of a designated strength. As such, the sensor(s) 206 sensing that the strength of a magnetic field is below a designated strength may indicate that the gun 202 is deployed from, for example, a holster, a safe and/or picked up from a surface. As an example of a sensor 206 that may sense the presence or absence of a magnetic field, the sensor(s) 206 may be a Hall-effect sensor.

As another example, the sensor(s) may sense a specific movement of the gun 202 to sense whether the gun 202 is in use. For example, the sensor(s) 206 may be accelerometers and/or gyroscopes. In this example, the sensor(s) 206 may sense if there is motion of the gun 202 in a direction that is greater than a threshold length, motion of the gun 202 that persists for more than a threshold amount of time, a change in angular direction of the barrel of the gun 202 that is greater than a threshold angle and/or a change in angular direction of the gun 202 changes at a rate faster than a threshold rate. In embodiments, the threshold length, threshold amount of time, threshold angle and/or the threshold rate may be configurable and/or user dependent. Other example sensors that may be used to determine whether the gun 202 has been deployed include, but are not limited to, a pressure sensor, a proximity sensor, a reed switch, and/or the like.

The signals sensed by the sensor(s) 206 may be transmitted to the processing device 208. In response to receiving a signal indicating that the gun 202 is in use, the processing device 208 may transition itself and/or the recording module 210 from a lower-power state to a higher-power state. In embodiments, the recording module 210 may be configured to record one or more of the following: a video camera for recording a visual aspect, a microphone for recording an audio aspect, a temperature sensor for sensing a temperature of the environment of the recording device 204, a pressure sensor for sensing a pressure of the environment of the recording device 204, one or more motion sensors (e.g., gyroscopes, accelerometers and/or the like) for measuring motion of the recording device 204, date, time and/or location of the recording device 204. Similar to above, the pressure sensor for sensing pressure of the environment of the recording device 204 may be a different than the pressure sensor used for determining whether or not the handgun 202 is deployed or un-deployed. Additionally or alternatively, the recording device 204 may be configured to include a time stamp on any recordings. The time stamp may indicate a local time that the recording was recorded.

In embodiments, the higher-power state is a state where the recording module 210 can record one or more aspects of the environment of the gun 202. In embodiments, the lower-power state may be when the processing device 208 is in a low-power sleep mode and the recording module 210 is in an off state. When the lower-power state is a low-power sleep mode for the processing device 208 and/or an off state for the recording module 210, the power consumed by the recording device 204 is at its lowest. However, the time required for the recording module 210 to transition from a lower-power state to a higher-power state is the longest. In embodiments, the longevity of the power source 220 may be advantageous. At other times, the time delay to transition from a lower-power state to a higher-power state may be a disadvantage and a shorter delay may be desirable.

As such, in embodiments, the lower-power state may be a low-power sleep mode for the processing device 208 and the recording module 210. In these embodiments, the recording module 210 may be capable of transitioning from the lower-power state to a higher-power state in approximately 2 seconds or less. Additionally or alternatively, the time delay to transition from a lower-power state to a higher-power state may be configured to be less than the average time it takes for a law enforcement officer to draw his/her gun out of his/her holster. In these embodiments, the power source 220 will not last as long as when the lower-power state is an off state; however, the reduced time delay to transition from a lower-power state to a higher-power state for the recording module 210 may be advantageous for a user of the recording device 204. For example, if the user would like to begin recording an encounter less than a couple of seconds after the sensor(s) 206 senses that the gun 202 is in use, this lower-power state may be desirable.

Alternatively, in embodiments, the lower-power state may be a mode in which the processing device 208 is operating normally but the recording module 210 is still in a lower-power sleep mode. In these embodiments, the recording module 210 may be capable of transitioning from the lower-power state to a higher-power state in approximately 0.5 seconds or less. In these embodiments, the power source 220 will not last as long as when the lower-power state is in one of the other lower-power sleep modes; however, the reduced time delay to transition from a lower-power state to a higher-power state by the recording module 210 may be desirable for a user when the user would like the recording module 210 to begin recording almost as soon as the sensor(s) 206 senses the gun 202 is in use.

In embodiments, the recording device 204 may allow a user to switch between the different lower-power states described above via the data port 214, the transceiver 216 and/or the user interface 218. Alternatively, in embodiments, only an administrator of the recording device 204 may be able to switch between the different lower-power states described above via the user interface 218 and/or via the data port 214, the transceiver 216 and/or the user interface 218. This may prevent a user of the recording device 204 from accidentally or intentionally tampering with the recording device 204.

The processing device 208 may be any arrangement of electronic circuits, electronic components, processors, program components and/or the like configured to store and/or execute programming instructions, to direct the operation of the other functional components of the recording device 204 and may be implemented, for example, in the form of any combination of hardware, software, and/or firmware.

In embodiments, the recordings may be incremented at specified time increments (e.g., 5 minutes, 10 minutes, 20 minutes, 30 minutes and/or the like). As such, when reviewing any of the recordings, a user may be able to quickly fast forward through specified time increments by moving from one indexed recording to the next. Additionally or alternatively, the recordings may be: indexed (e.g., 1, 2, 3, etc.; 01, 02, 03, etc.; 001, 002, 003, etc.; 0001, 0002, 0003, etc.; A, B, C, etc. and/or the like) and/or include time stamps.

In embodiments, the recordings of the recording module 210 may be saved in memory 212. The saved recordings may be password protected, encrypted, access limited (e.g., only an authorized user such as an administrator may have access to the saved recordings on memory 212), and/or the like. In embodiments, the recordings may be segmented into multiple files that include 1 minute, 2 minute, 3 minute, and/or the like segments. In embodiments, if the memory 212 is full the recordings may loop and save over the earliest saved recordings in memory 212. In embodiments, segmenting the recordings into multiple files may facilitate reducing the amount of recordings that are recorded over in comparison to embodiments where the recordings are saved as one file. In embodiments, saving over the earliest saved recordings in memory 212 may be disabled, so that once memory 212 is full, the recording stops saving to memory 212 and, in embodiments, only transmits the data via a communication link 228 to an external communication device 222. In embodiments, the memory 212 may be incorporated into the recording device 204 or external to the recording device 204. In embodiments, the system 200 may include internal and/or external memory devices 212. In embodiments, the memory 212 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like, including memory that may be compatible with existing law enforcement and/or other data management system.

In embodiments, the recordings may be transmitted to an external communication device 222 via a network 224 where the recordings can be saved on a server 226. In embodiments, recordings may also be transferred from the recording device 204 to the server 226 via a wireless or wired connection (e.g., via the data port 214). In embodiments, the data management of the recording device 204 may be compatible with existing law enforcement data management systems and requirements. Additionally or alternatively, the transmission may be encrypted via public-key encryption methods and/or other types of encryption.

In embodiments, the recordings may be transmitted to the server 226 at a specified time interval and/or upon demand. Additionally or alternatively, the recordings may be transmitted to the server 226 when a designated amount of space on the memory 212 has been used. For example, when 70%, 80%, 90%, and/or 100% of the memory 212 has been used, the recordings may be transmitted to the server 226. Additionally or alternatively, the recordings may be transmitted to the server 226 upon certain conditions occurring (e.g., the gun 202 being fired and/or a law enforcement officer returning to the station at which he/she works).

In response to transmitting one or more recordings to the server 226, the server 226 may send a response to the recording device 204 indicating the recordings that were received by the server 226 from the recording device 204. After transferring the recordings to a server 226, the processing device 208 may be configured to erase the recordings saved on the memory 212. Alternatively, the recordings may only be erased from memory 212 by an authorized user (e.g., an administrator).

Additionally or alternatively, a recording that includes a portion where the gun 202 was fired may be stored on memory 212 with one or more indicia indicating the gun 202 was fired. For example, the recording may include an icon, a colored border and/or the like in a portion of the video. As another example, the recording may be indexed and/or saved on memory 212 in a manner that identifies the recording as including a portion where the gun 202 was fired. In embodiments, recordings that include a portion where the gun 202 was fired may immediately and/or automatically be transmitted to a server 226 via the network 224. In embodiments, the one or more indicia may be compatible with existing law enforcement data management systems and requirements.

In embodiments, the network 204 may use a communication link 228. In embodiments, the communication link 228 may be, or include, a wireless communication link such as, for example, a short-range radio link, such as Bluetooth, IEEE 802.11, a proprietary wireless protocol, and/or the like. In embodiments, for example, the communication link 228 may utilize Bluetooth Low Energy radio (Bluetooth 4.1), or a similar protocol, and may utilize an operating frequency in the range of 2.40 to 2.48 GHz. The term "communication link" may refer to an ability to communicate some type of information in at least one direction between at least two devices, and should not be understood to be limited to a direct, persistent, or otherwise limited communication channel. That is, according to embodiments, the communication link 228 may be a persistent communication link, an intermittent communication link, an ad-hoc communication link, and/or the like. The communication link 228 may refer to direct communications between the recording device 204 and the external communication device 222, and/or indirect communications that travel between the recording device 204 and the external communication device 222 via at least one other device (e.g., a repeater, router, hub, and/or the like). The communication link 228 may facilitate uni-directional and/or bi-directional communication between the recording device 204 and the external communication device 222. Data and/or control signals may be transmitted between the recording device 204 and the external communication device 222 to coordinate the functions of the recording device 204 and/or the external communication device 222. In embodiments, the communication link 228 may be compatible with existing law enforcement data management systems and requirements.

FIG. 18 is a flow diagram of an example method 300 for operating a gun-mounted recording device with auto on, in accordance with embodiments of the present disclosure. In embodiments, the recording device may have some or all of the same functionality as the recording device 104 depicted in FIGS. 1-8 and 10-17 and/or the recording device 204 depicted in FIG. 18. For example, the recording device may be coupled to a gun (e.g., the gun 102 depicted in FIGS. 1-17 and/or the gun 202 depicted in FIG. 18) and include a recording module, for example, the recording module 104 depicted in FIGS. 1-8 and 10-17 and/or the recording module 210 depicted in FIG. 18 for recording at least one aspect of the gun's environment and/or the recording device's environment. In embodiments, the at least one aspect may be one or more of the following: a visual aspect, an audio aspect, a motion aspect of the gun, a temperature aspect, a pressure aspect, date, time and/or location of the recording device. In embodiments, the recording device includes an auto-on feature, as described in more detail below.

Method 300 includes receiving a signal associated with a gun being deployed (block 302). In embodiments, the signal may be received by a processing device (e.g., the processing device 144 depicted in FIGS. 15 and 17 and/or the processing device 208 depicted in FIG. 18) that is incorporated into the recording device. As indicated above, to be deployed, the gun does not have to be fired. Instead, the gun may be deployed if it is withdrawn from a holster and/or safe, picked up from a surface (e.g., a nightstand drawer, automobile glove box and/or the like) and/or moved the gun in such a way that would indicate that a user is using the gun, such as pointing the gun at a target, in the vicinity of a target and/or in a direction in which the user believes there to be a target.

The received signal may be provided by one or more sensors. In embodiments, the one or more sensors may have some or all of the same functionality as the sensor 146 depicted in FIG. 15 and/or the sensor(s) 206 depicted in FIG. 18. For example, the one or more sensors may sense that the gun, to which the sensors are coupled, is in use by no longer sensing a magnetic field above a specific threshold. That is, when the sensor is moved a sufficient distance away from a magnet that is disposed in or on a holster, a safe and/or a surface, the sensor may no longer sense a magnetic field above a specific threshold. A signal indicating that the sensor no longer senses a magnetic field above a specific threshold may be transmitted by the sensor to a processing device. The processing device may then determine from the received sensed signal that the sensor is no longer in proximity to the magnet and, therefore, determine that the gun is in use. Further details of embodiments of an auto-on feature are discussing in, for example, U.S. application Ser. No. 13/720,083, entitled "Auto-On Green Laser Sight," which is hereby incorporated by reference in its entirety.

Additionally or alternatively, one or more sensors may sense movement of the gun to which the sensors are coupled. For example, the one or more sensors may be accelerometers and/or gyroscopes. In this example, the one or more sensors may sense if there is motion of the gun in a direction that is greater than a threshold length, persists for more than a threshold amount of time and/or changes the angular direction of the barrel of the gun. A signal indicating that the sensor senses one or more of these types of movements may be transmitted by the one or more sensors to a processing device. The processing device may then determine from the received sensed signal that the gun is experiencing motion that does not indicate normal jostling of a gun that is being carried, but instead indicates that the gun is being pointed in a direction purposefully. Other example sensors that may be used to determine whether the gun 202 has been deployed include, but are not limited to, a pressure sensor (e.g., a grip pressure sensor), a proximity sensor, a reed switch, and/or the like.

After receiving a signal associated with a gun being in use, method 300 may initiate a transition of the processing device and/or the recording module of the recording device from a lower-power state to a higher-power state (block 304). In embodiments, the higher-power state and the lower-power state may be the same or similar to the higher-power and lower-power states described above in relation to FIG. 18.

After the recording module of the recording device is in a higher-power state, the method 300 further includes recording at least one aspect of the gun's environment (block 306). In embodiments, the at least one aspect of the gun's environment may be one or more of the following: a visual aspect, an audio aspect, a motion aspect of the gun, a temperature aspect, a pressure aspect, date, time and/or location of the recording device. In embodiments, the at least one recorded aspect may be saved on memory (e.g., the memory 212 depicted in FIG. 18).

In embodiments, the method 300 may include transmitting, via a wired and/or wireless transmission, the at least one recorded aspect to an external memory device (block 308). In embodiments, the external memory device may have some or all of the same functionality as the server 226 depicted in FIG. 18. In embodiments, the transmission of the at least one recorded aspect to an external device may be the same or similar to the transmission of the recordings from the recording device 204 to the server 226 as described above in relation to FIG. 18. For example, in embodiments, the processing device may receive a verification signal indicating that the transmitted signal from the processing device to the server was received by the server (block 310). After the at least one recorded aspect is transmitted to an external memory device, the at least one recorded aspect may still be stored on memory of the recording device.

Additionally or alternatively, the method 300 may include transitioning from the higher-power state to a lower-power state (block 312) in response to a sensor sensing the gun is not deployed, for example, has been returned to a holster, safe and/or surface and/or the gun has not been moved in such a way that would indicate that a user is no longer using the gun. After transitioning to a lower-power state, the recording device may no longer be recording.

Although the term "block" may be used herein to connote different elements illustratively employed, the term should not be interpreted as implying any requirement of, or particular order among or between, various blocks disclosed herein. Similarly, although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

Figure 20:
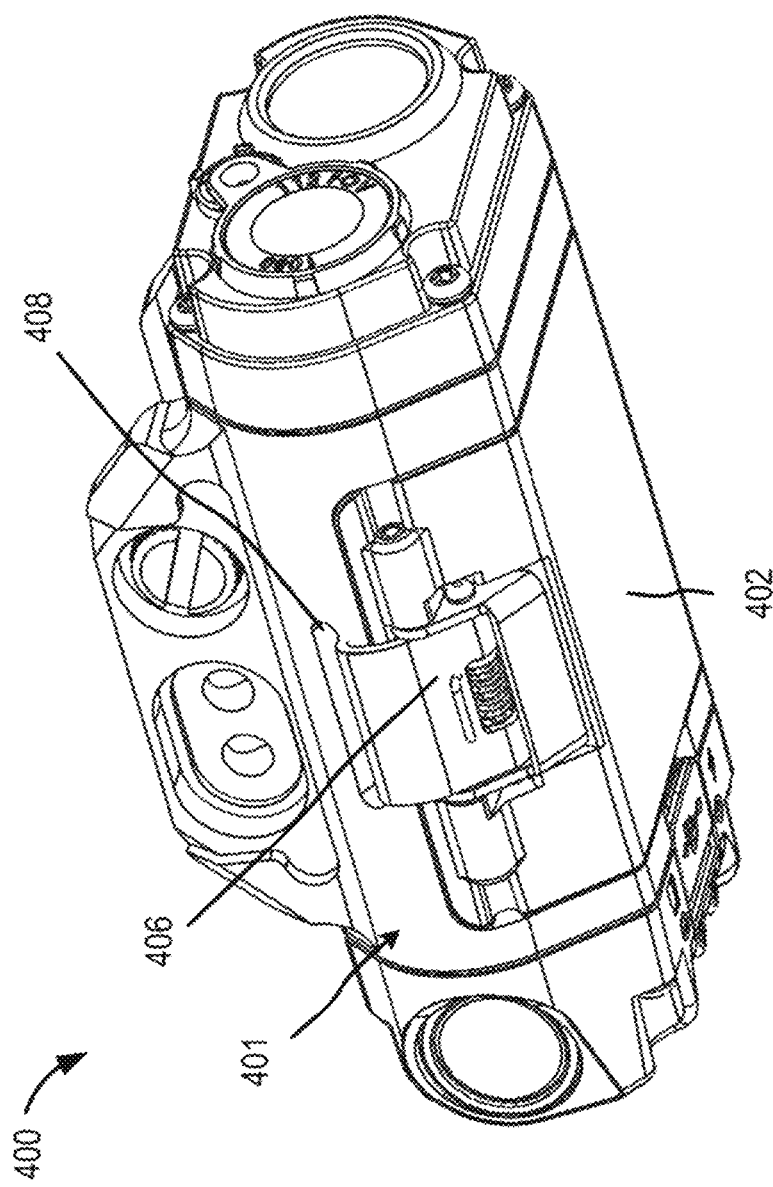
FIG. 20 depicts another perspective view of the recording device and a power source attached thereto, in accordance with embodiments of the present disclosure.

FIG. 20 depicts a recording device 400, in accordance with embodiments of the present disclosure. In at least some embodiments, the recording device 400 includes the same or similar features as the recording device 104 and/or the recording device 204 described above. The recording device 400 includes a recording module 401 and a power supply 402 detachably coupled thereto. The power supply 402 supplies power to the recording module 401 so the recording module 401 can record video of different scenes when the recording module 401 is set to record. In at least some embodiments, the recording module 401 may be turned on/off via the auto on/off embodiments described above.

The power supply 402 may be a rechargeable power supply (e.g., a rechargeable battery). In at least some embodiments, the power supply 402 is configured to be detachable from the recording module 401 so the recording module 401 does not have to be removed from the gun 102 in the event the power supply 402 needs to be removed to be recharged. As such, the sighting of the recording module 401 does not have to be recalibrated each time the power supply 402 needs to be removed and/or recharged. In embodiments, however, the power supply 402 can be charged wirelessly (e.g., inductively) as described above and in at least some of these embodiments, the power supply 402 does not need to be removed from the recording module 401.

Figure 21:
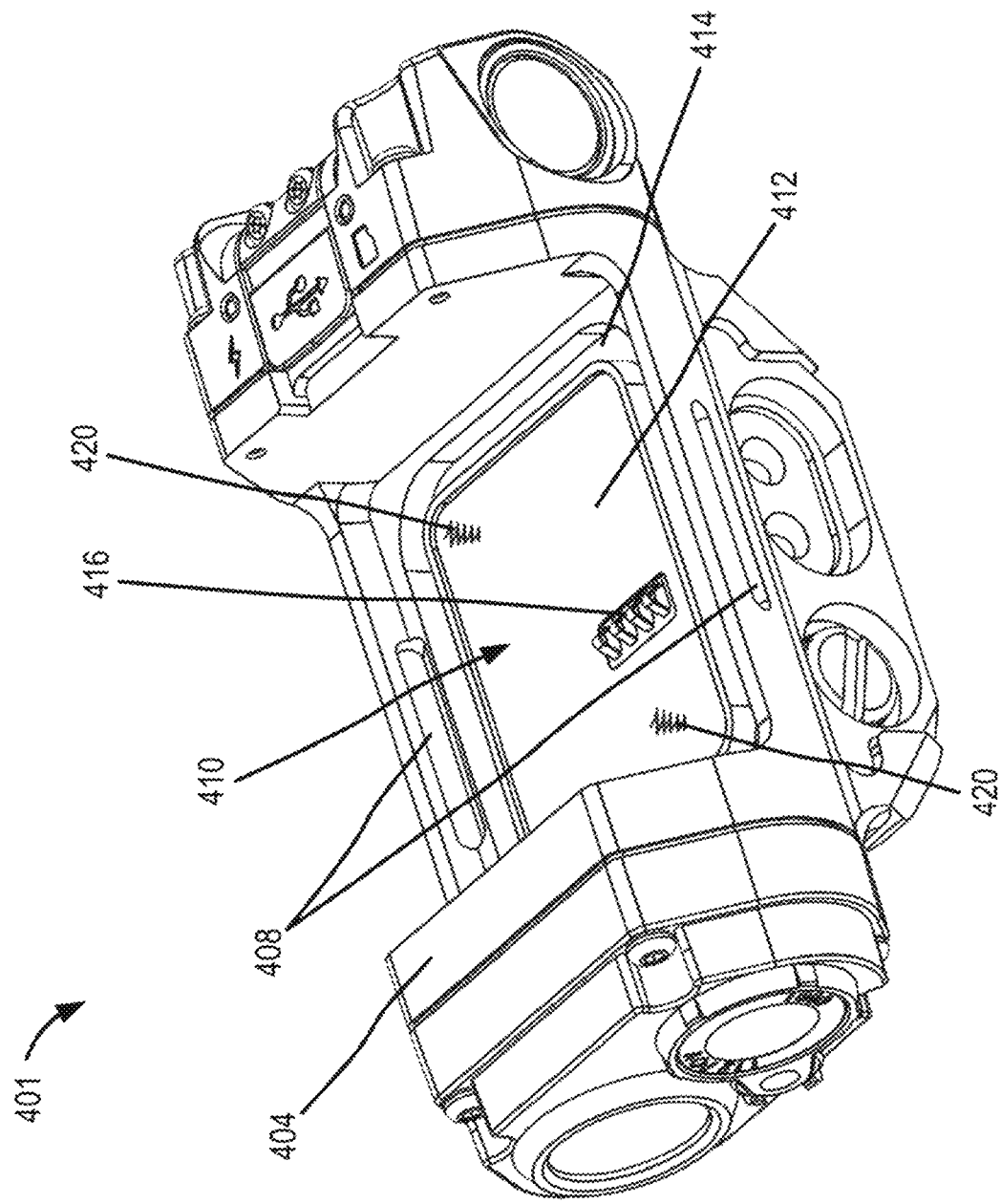
FIG. 21 depicts the recording device depicted in FIG. 20 with the power source removed, in accordance with embodiments of the present disclosure.

The recording module 401 includes a housing 404 configured to receive the power supply 402, as illustrated in FIG. 21, which depicts the recording module 401 without the power supply 402 coupled thereto. In certain embodiments, the power supply 402 includes a coupler 406 configured to be coupled (e.g., removably) to a coupler 408 of the housing 404, as shown in FIG. 20. In various embodiments, the coupler 406 includes a clip (e.g., a butterfly clasp) configured to engage the coupler 408, which may include a recess. In some examples, the coupler 406 of the power supply 402 includes a plurality of couplers (see FIG. 24). Similarly, the coupler 408 of the housing 404 may include a plurality of couplers (see FIG. 21). In various embodiments, the housing 404 is configured to be mounted to the gun 102.

Referring to FIG. 21, the housing 404 defines a power source receptacle 410 configured to receive the power supply 402. In certain embodiments, the housing 404 includes a backing 412 configured to engage and/or support the power supply 402, such as when the power supply 402 is coupled to the housing 404. In various embodiments, the housing 404 defines one or more recesses 414 configured to engage a portion of the power supply 402 to form a seal (e.g., a hermetic seal), such as to prevent dust or debris to enter. In certain embodiments, the recess 414 is on the power supply 402 and configured to engage the housing 404 to form the seal.

In at least some embodiments, the recording device 400 includes a first electrical contact 416. In various embodiments, the first electrical contact 416 is configured to be electrically coupled to the power supply 402 via a second electrical contact 418 (depicted in FIG. 24) included on the power supply 402. The first electrical contact 416 and the second electrical contact 418 are configured to contact each other and form a circuit when the power supply 402 is coupled to the recoding module 401. When forming a circuit, the first electrical contact 416 is configured to receive electrical power from the power supply 402 via the second electrical contact 418 and transport the received power to circuity of the recording module 401 (described in more detail below). The first electrical contact 416 and/or the second electrical contact 418 may be a spring contact. In some embodiments, the first electrical contact 416 and/or the second electrical contact 418 may include more than one spring contact (e.g., two, three, four, etc. spring contacts). In at least some embodiments, the first electrical contact 416 and/or the second electrical contact 418 is gold-plated.

In embodiments, the first electrical contact 416, the second electrical contact 418, or both are configured to move in response to relative movement between the power supply 402 and the recoding module 401 when the power supply 402 is coupled to the housing 404. As such, the first electrical contact 416 and the second electrical contact 418 can maintain contact with one another so that the supply of power from the power supply 402 to circuity of the recording module 401 is maintained when the gun 102 experiences a shock such as, for example, when the gun 102 is drawn, impacted, and/or discharged. Conversely, if the first electrical contact 416 and/or the second electrical contact 418 did not move in response to such a shock, it's likely contact between any electrical contacts of a removable power source and a recording module would not be maintained, and one or more recordings of the recording module 401 may become corrupted.

In some exemplary embodiments, the housing 404 of the recording module 401 includes one or more dampening springs 420 configured to reduce the movement between the recoding module 401 and the power supply 402. In some embodiments, the dampening spring 420 is disposed on the backing 412 and configured to engage the power supply 402 (see FIG. 24). Additionally or alternatively, the power supply 402 may include one or more dampening springs 422 (illustrated in FIG. 24). In at least some embodiments, the dampening springs 420, 422 do not form part of the electrical circuit that provides power from the power supply 402 to the recording module 401. Instead, the dampening springs 420, 422 may be included in the housing 404 and/or the power supply 402, respectively, to reduce movement between the power supply 402 and the recording module 401 when the recording device 400 experiences a shock. In certain embodiments, the dampening springs 420, 422 each include a plurality of dampening springs.

Figure 22:
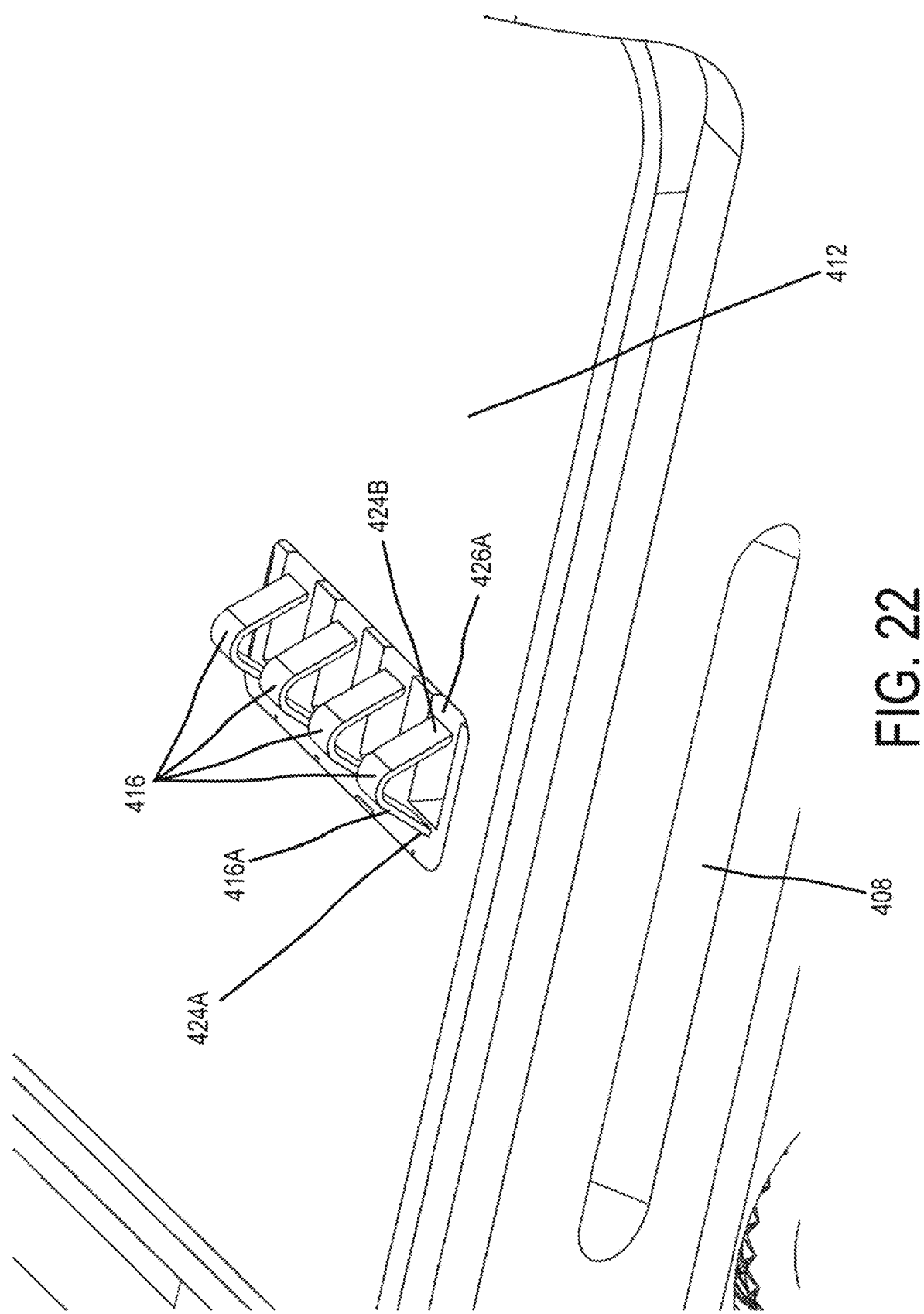
FIG. 22 depicts an electrical contact of the recording device, in accordance with embodiments of the present disclosure.

FIG. 22 depicts the first electrical contact 416 of the recording module 401, in accordance with embodiments of the present disclosure. In certain embodiments, the first electrical contact 416 is configured to be electrically coupled to the power supply 402, such as by physically engaging the second electrical contact 418 (see FIG. 24) of the power supply 402. In some embodiments, the first electrical contact 416 includes a plurality of electrical contacts 416, as illustrated. In various embodiments, each electrical contact (e.g., electrical contact 416A) includes a first end 424A and a second end 424B. In certain embodiments, the first end 424A is a fixed end fixedly coupled to the recording module 401, and the second end 424B is a free end configured to move, such as to move in response to the relative movement between the power supply 402 and the recording module 401. In some embodiments, at least part of the electrical contact 416A enters a first recess 426A (e.g., one of a plurality of recessed) when engaged with the power supply 402. In some examples, the first recess 426A is defined by the backing 412 and/or the housing 404. In various embodiments, the first electrical contact 416 is configured to adjust to maintain electrical coupling and optionally physical coupling between the power supply 402 and the recording device 400.

In at least some embodiments, the first electrical contact 416 is a spring contact. Alternatively, the first electrical contact 416 may be a spring-loaded pin (e.g., a pogo pin) configured to engage a battery contact of the power supply 402. In certain examples, the spring-loaded pin is configured to adjust a degree of protrusion in response to a relative movement between the power supply 402 and the housing 404. By adaptively adjusting the degree of protrusion, the spring-loaded pin is configured to maintain electrical coupling and optionally physical coupling between the power supply 402 and the recording module 401. In various examples, the spring-loaded pin is configured to be coupled to a socket of the power supply 402 and to engage a battery contact in the socket. The socket may further help maintain electrical coupling and optionally physical coupling between the power source and the rest of the recording device via the spring contact.

Figure 23:
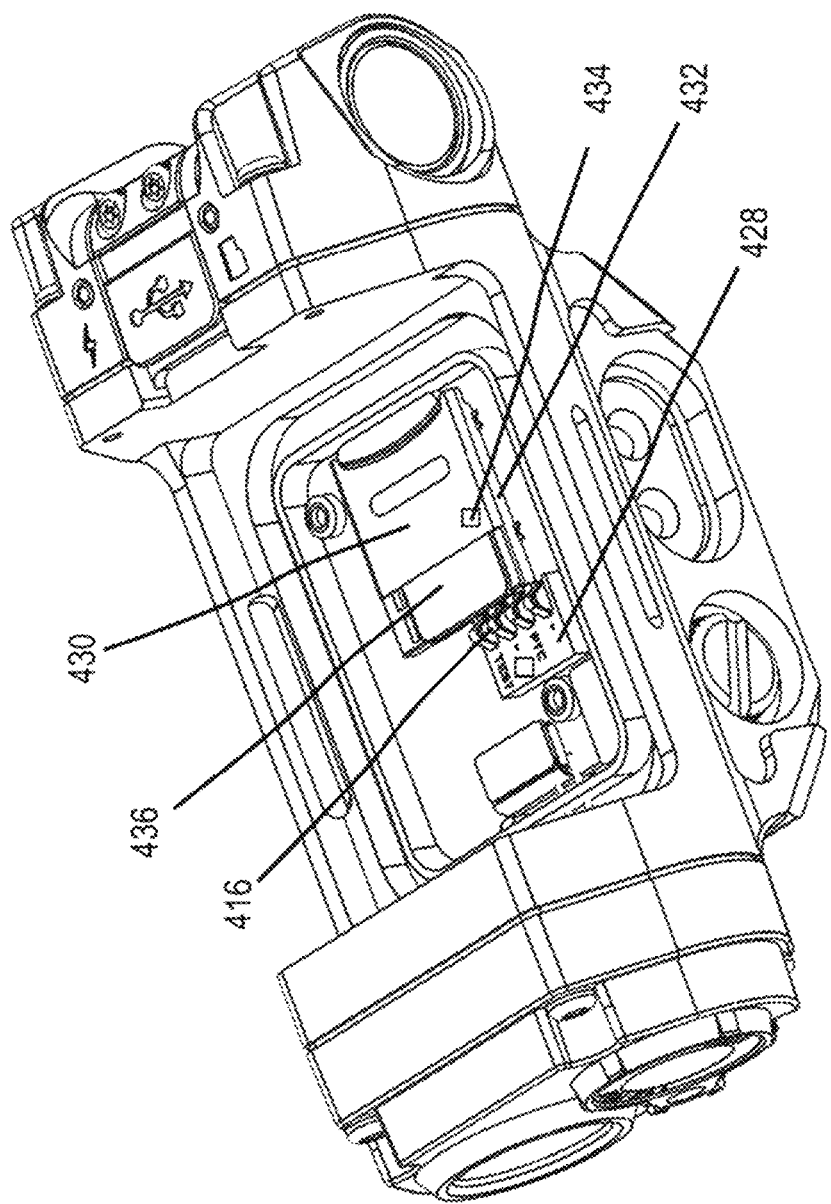
FIG. 23 depicts the recording device depicted in FIG. 21 with a backing removed, in accordance with embodiments of the present disclosure.

FIG. 23 depicts the recording module 401 with the power supply 402 and the backing 412 removed, in accordance with embodiments of the present disclosure. In various embodiments, the first electrical contact 416 is electrically coupled (e.g., fixedly) to a circuit board 428 of the recording device 400. The circuit board 428 may be coupled to a memory module 430 configured to store recordings of the recording module 401. In certain examples, the power supply 402 delivers power to the circuit board 428 and/or the memory module 430 via the spring contact 416.

In embodiments, the recording device 400 includes an internal power unit 432. The internal power unit 432 may be coupled to the circuit board 428 and/or the memory module 430. In at least some embodiments, the internal power unit 432 is configured to provide power to the recording module 401 (e.g., the circuit board 428 and/or the memory module 430) when the power supply 402 is unable to provide power to the recording module 401, such as when a charge level of the power supply 402 is below a critical threshold and/or when the power supply 402 is not coupled to the recording module 401. In at least some embodiments, the internal power unit 432 is a capacitor and/or an inductor.

Additionally or alternatively, the internal power unit 432 is configured to power a clock 434 of the recording device 400. In some embodiments, the clock 434 is incorporated into the memory module 432 and provides time stamps for the recordings of the recording device 400, which may provide some of the benefits described below.

In at least some embodiments, the circuit board 428, powered by the power supply 402 and/or the internal power unit 432, is configured to record a timing diagram of the power level in the recording module 401, such as to record voltage and/or current received from the power supply 402 with respect to time. Such timing diagram may register timestamps corresponding to when the power supply 402 is connected and when the power supply 402 is disconnected. The timing diagram may also register when the recording module 401 starts recording and when it stops recording. Such timing diagram may be analyzed (e.g., by an enforcement official) to help determine whether a recording generated by the recording module 401 includes power interruptions that may be indicative of tampering of the recording device (e.g., by a bad actor). For example, the recording module 401 may be configured to label loss in power greater than a time threshold (e.g., 1 second) as questionable disconnection for prompting further investigation for potential tampering of the recording module 401. The timing diagram may be outputted (e.g., by the circuit board 428) in the form of a text log file and/or saved to memory. In various embodiments, the log file comprises at least one selected from the group of: power states, power levels, connectivity of the power source, and recording of the recording module 401. As an example, when the recording is corrupted and unable for viewing, such timing diagram may be correlated to a loss in power (e.g., disconnection of the power supply 402).

In various embodiments, upon awaking from a lower power state, as described above, the circuit board 428 may prioritize certain functions to help minimize delay in recording. For example, the circuit board 428 may prioritize the start of recording prior to restoring settings such as configurations and status of the recording module (e.g., white balance), memory (e.g., free memory), and battery (e.g., storage level). Additionally or alternatively, the circuit board 428 may be configured to instruct the recording module 401 to initiate recording prior to restoring settings of the recording module 401 after an interruption of power (e.g., disconnection of power supply 402) to the recording module 401.

In various embodiments, the recording module 401 includes a first circuit 436. configured to wirelessly receive power from a second circuit 438 (of FIG. 24) of the power supply 402. The first and second circuits 436, 438 may be used to reduce the likelihood an interruption of power from the power supply 402 to the recording module 401 occurs. The first and second circuits 436, 438 may be inductors. Additionally or alternatively, the second circuit 438 may be used to inductively charge the power supply 402.

Figure 24:
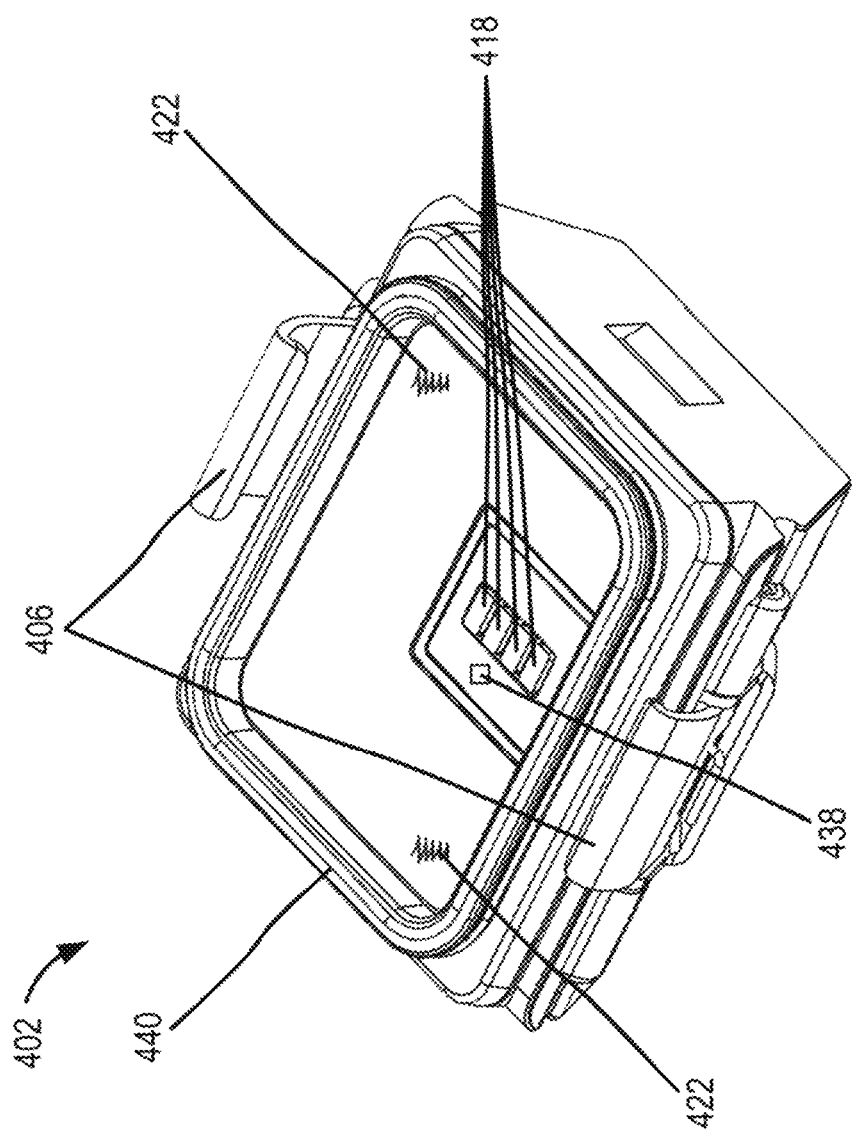
FIG. 24 depicts the power source, in accordance with embodiments of the present disclosure.

FIG. 24 depicts the power supply 402, in accordance with embodiments of the present disclosure. As stated above, the power supply 402 includes a coupler 406 configured to be coupled to the coupler 408 of the housing 404, to secure the power supply 402 to the housing 404 (see FIG. 20). In at least some embodiments, the coupler 406 includes a plurality of couplers 406. Further, the power supply 402 may include a second electrical contact 418. The second electrical contact 418 is configured to be electrically coupled to the first electrical contact 416 to transfer power from the power supply 402 to the recording device 400

In at least some embodiments, the power supply 402 includes a sealing member 440. The sealing member 440 is configured to engage the recess 414 of the housing 404 to form a seal and prevent debris and/or liquid from entering between the power supply 402 and the housing 404 when the power supply 402 is coupled to the housing 404.

As stated above, the recording device 400 includes a secondary spring contact 422 in at least some embodiments. The secondary spring contact 422 may be the same or similar to the spring contact 416. For example, the secondary spring contact 422 may reduce the movement between the power source 402 and the recording module 401 in the event the recording device 400 experiences a shock. As such, the likelihood of a power disruption between the power supply 402 and the recording module 401 is decreased.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A gun-mounted electronic accessory device, the electronic accessory device comprising:
    a housing configured to be mounted to a gun;
    a recording module arranged within the housing, configured to record at least one aspect of the gun's environment, and communicatively coupled to a processing device arranged within the housing;
    a first illuminating device arranged within the housing and configured to illuminate an area forward of the electronic accessory device; and
    a power source configured to be received by and detachably coupled directly to the housing containing the recording module and first illuminating device when the housing is mounted to the gun, the power source having an outward facing surface comprising an exterior surface portion and an inner surface portion, wherein, when the power source is coupled to the housing, the inner surface portion of the power source interfaces with an inner surface portion of the housing and an exterior surface of the electronic accessory device comprises and outwardly defines the exterior surface portion of the power source and an exterior surface portion of the housing, and wherein, when the power source is detached from the housing for recharging, the housing containing the processing unit and the recording module remains mounted to the gun.

2. The gun-mounted electronic accessory device of claim 1, wherein the first illuminating device comprises one of a light-emitting diode and a laser module.

3. The gun-mounted electronic accessory device of claim 1, wherein the first illuminating device comprises a light-emitting diode.

4. The gun-mounted electronic accessory device of claim 1, wherein the first illuminating device comprises a laser module.

5. The gun-mounted electronic accessory device of claim 1, the electronic accessory device being configured to allow functional control of the first illuminating device independent of functional control of the recording module.

6. The gun-mounted electronic accessory device of claim 1, further comprising a user interface configured to functionally control the first illuminating device independent of functional control of the recording module.

7. The gun-mounted electronic accessory device of claim 1, further comprising a second illuminating device arranged within the housing and configured to illuminate an area forward of the electronic accessory device.

8. The gun-mounted electronic accessory device of claim 7, the first illuminating device comprising a light-emitting diode and the second illuminating device comprising a laser module.

9. The gun-mounted electronic accessory device of claim 8, the first illuminating device being communicatively coupled to the processing device, wherein the first illuminating device is configured to activate when the recording module is activated.

10. The gun-mounted electronic accessory device of claim 1, the first illuminating device being communicatively coupled to the processing device, wherein the first illuminating device is configured to activate when the recording module is activated.

11. The gun-mounted electronic accessory device of claim 1, the housing having an outward facing surface comprising an exterior surface portion and an inner surface portion, the electronic accessory device further comprising:
    a sensor communicatively coupled to the processing device, the sensor configured to:
        sense the gun is in use; and generate a first signal in response to sensing the gun is in use, the processing device being configured to:
  detect the generated first signal; and
  send a second signal in response to detecting the generated first signal; and the recording module being configured to transition to a higher-power state in response to receiving the second signal and record at least one aspect of the gun's environment in response to the second signal.

12. The gun-mounted electronic accessory device of claim 11, the housing having an upper mounting portion configured to be mounted under a barrel of the gun and the power source being downwardly disposed from the housing and positioned between forward and rearward ends of the housing.

13. The gun-mounted electronic accessory device of claim 1, further comprising a second illuminating device arranged within the housing and configured to illuminate an area forward of the electronic accessory device.

14. The gun-mounted electronic accessory device of claim 13, the first illuminating device comprising a light-emitting diode and the second illuminating device comprising a laser module.

15. A gun-mounted electronic accessory device having an exterior surface, the electronic accessory device comprising:
  a housing configured to be mounted to a gun, the housing having an outward facing surface comprising an exterior surface portion and an inner surface portion;
  at least one electronic device arranged within the housing and having an activation mechanism configured to transition the at least on electronic device from an inactive state to and active state; and
  a power source configured to be received by and detachably coupled directly to the housing containing the at least one electronic device when the housing is mounted to the gun, the power source having an outward facing surface comprising an exterior surface portion and an inner surface portion, wherein, when the power source is coupled to the housing, the inner surface portion of the power source interfaces with the inner surface portion of the housing and the exterior surface of the electronic accessory device comprises and outwardly defines the exterior surface portions of the power source and the housing, and wherein, when the power source is detached from the housing for recharging, the housing containing the at least one electronic device remains mounted to the gun.

16. The gun-mounted electronic accessory device of claim 15, the at least one electronic device comprising one or more of a recording module, a light-emitting diode, and a laser module.

17. The gun-mounted electronic accessory device of claim 15, the at least one electronic device comprising:
  a recording module arranged within the housing, configured to record at least one aspect of the gun's environment and communicatively coupled to a processing device arranged within the housing; and
  a first illuminating device arranged within the housing and configured to illuminate an area forward of the electronic accessory device.

18. The gun-mounted electronic accessory device of claim 17, wherein the first illuminating device comprises a light-emitting diode or a laser module.

19. The gun-mounted electronic accessory device of claim 17, wherein the first illuminating device comprises a light-emitting diode.

20. The gun-mounted electronic accessory device of claim 17, the electronic accessory device being configured to allow functional control of the first illuminating device independent of functional control of the recording module.

* * * * *